United States Patent

Doi

[11] Patent Number: 5,875,159
[45] Date of Patent: Feb. 23, 1999

[54] OPTICAL DEVICE WHICH CAN GENERATE TRACKING SIGNAL USING SPLIT PHOTO DETECTING DEVICES

[75] Inventor: Masato Doi, Kanagawa, Japan

[73] Assignee: Sony Corporation, Tokyo, Japan

[21] Appl. No.: 831,642

[22] Filed: Apr. 9, 1997

[30] Foreign Application Priority Data

Apr. 10, 1996 [JP] Japan .................................. 8-088490

[51] Int. Cl.$^6$ ..................................................... G11B 7/12
[52] U.S. Cl. ........................................ 369/44.24; 369/112
[58] Field of Search .................................... 369/112, 109, 369/105, 118, 44.14, 44.12, 44.23, 44.24, 44.41

[56] References Cited

U.S. PATENT DOCUMENTS 5,253,236  10/1993  Latta et al. .......................... 369/44.24
5,341,355  8/1994   Gotoh et al. ..................... 369/44.24 X
5,590,110  12/1996  Sato .................................. 369/44.24 X Primary Examiner—Muhammad N. Edun
Attorney, Agent, or Firm—Hill & Simpson

[57] ABSTRACT

An optical device 10 including a photo-detector PD for converging light LF emitted from a light-emitting means LD on a recording medium and detecting returned light LR reflected from the recording medium and shield 2 disposed between the recording medium and the photo-detector means PD for shielding a part of returned light. The shield 2 includes edges in at least two directions and is disposed so as to shield the returned light LR by these edges. The photo-detector PD is split in the direction substantially perpendicular to the recording medium at its at least an axis T in which a signal is recorded. The optical device can generate a tracking signal by comparing signals detected by the split photo-detector PD.

10 Claims, 20 Drawing Sheets

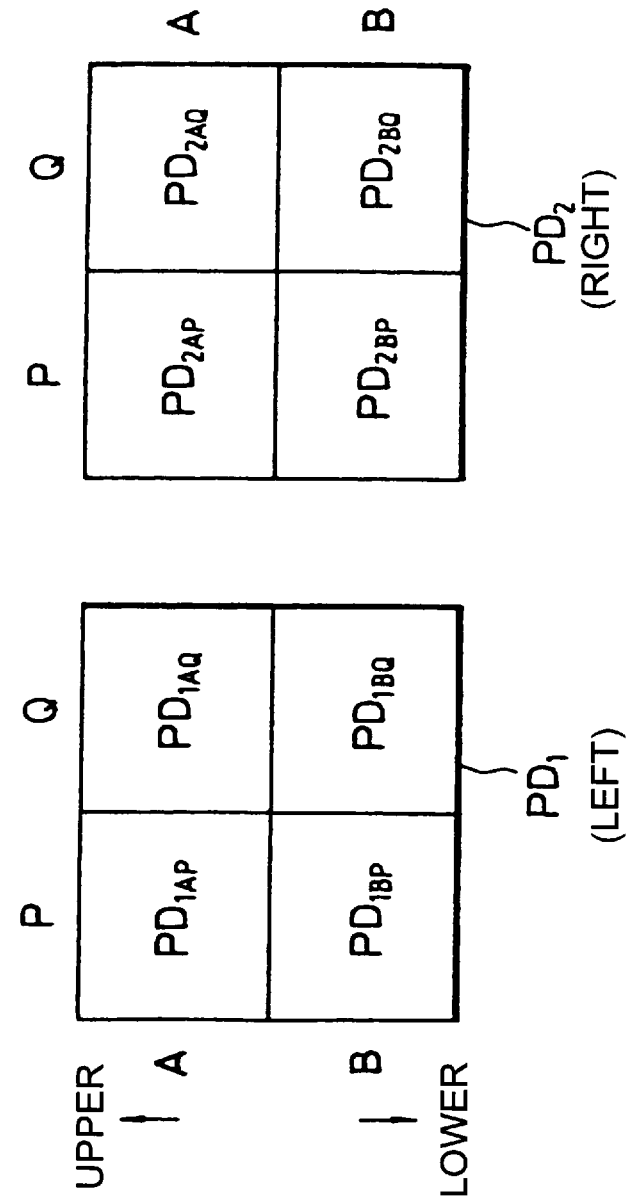

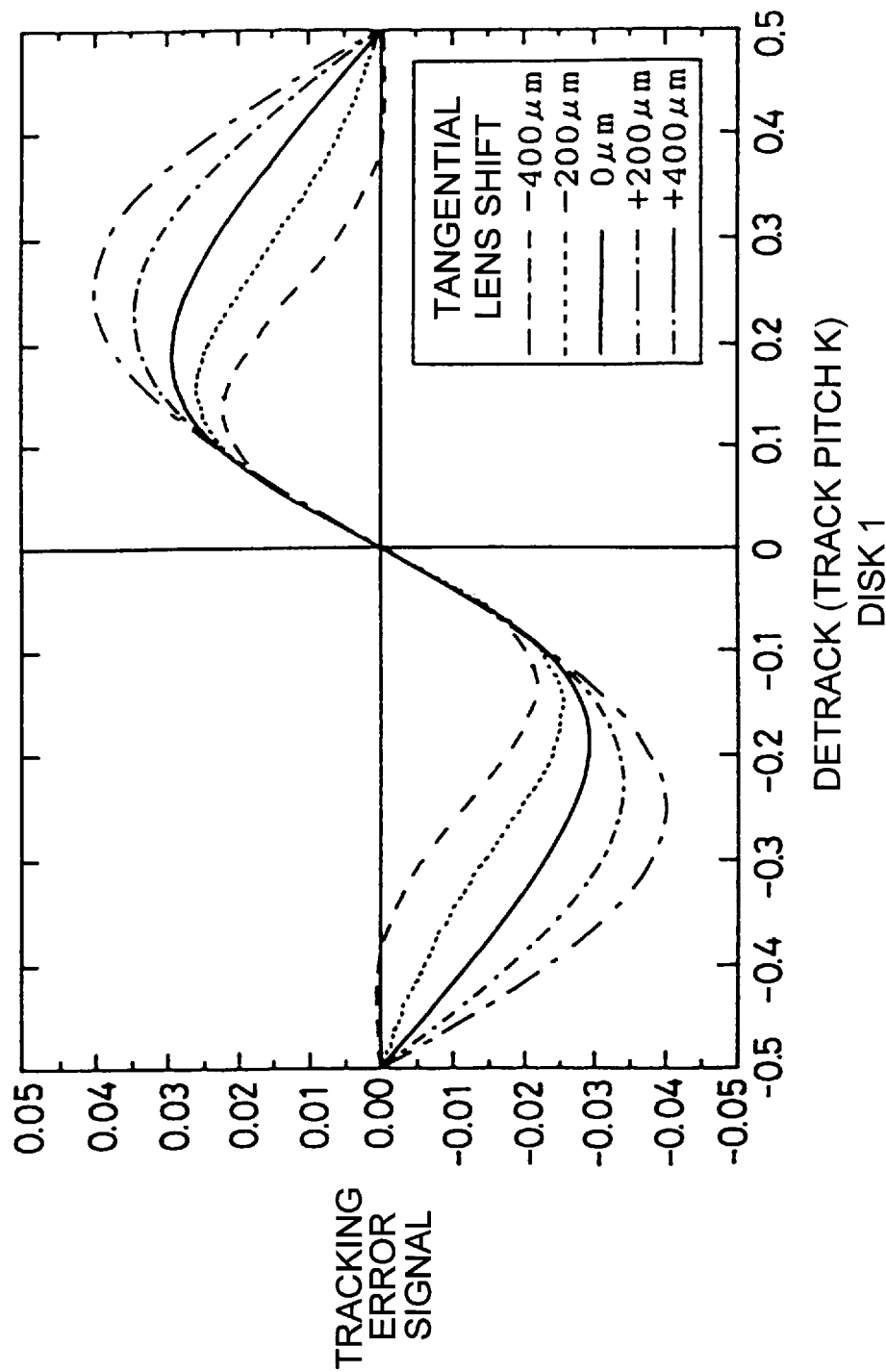

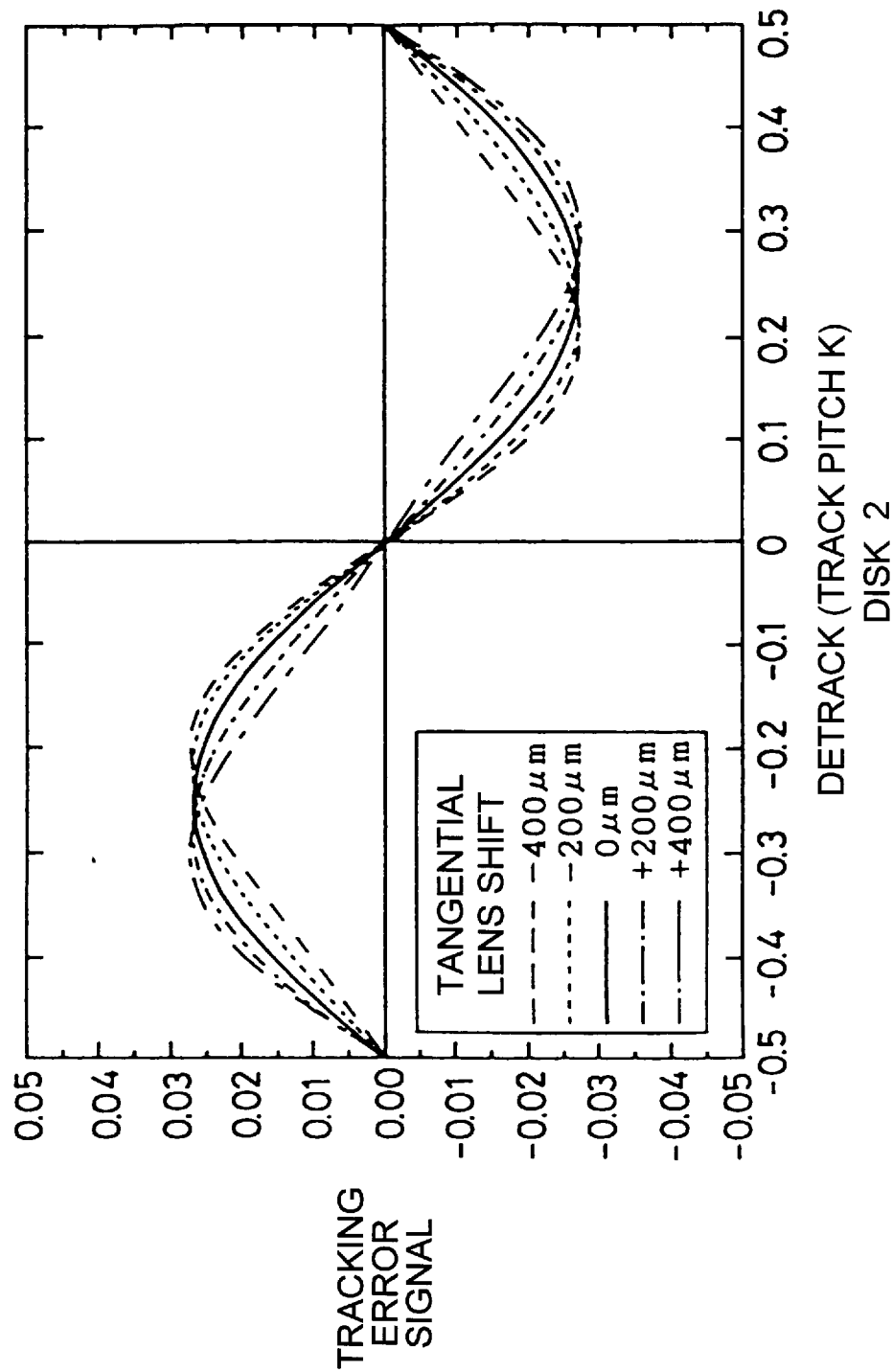

FIG. 14
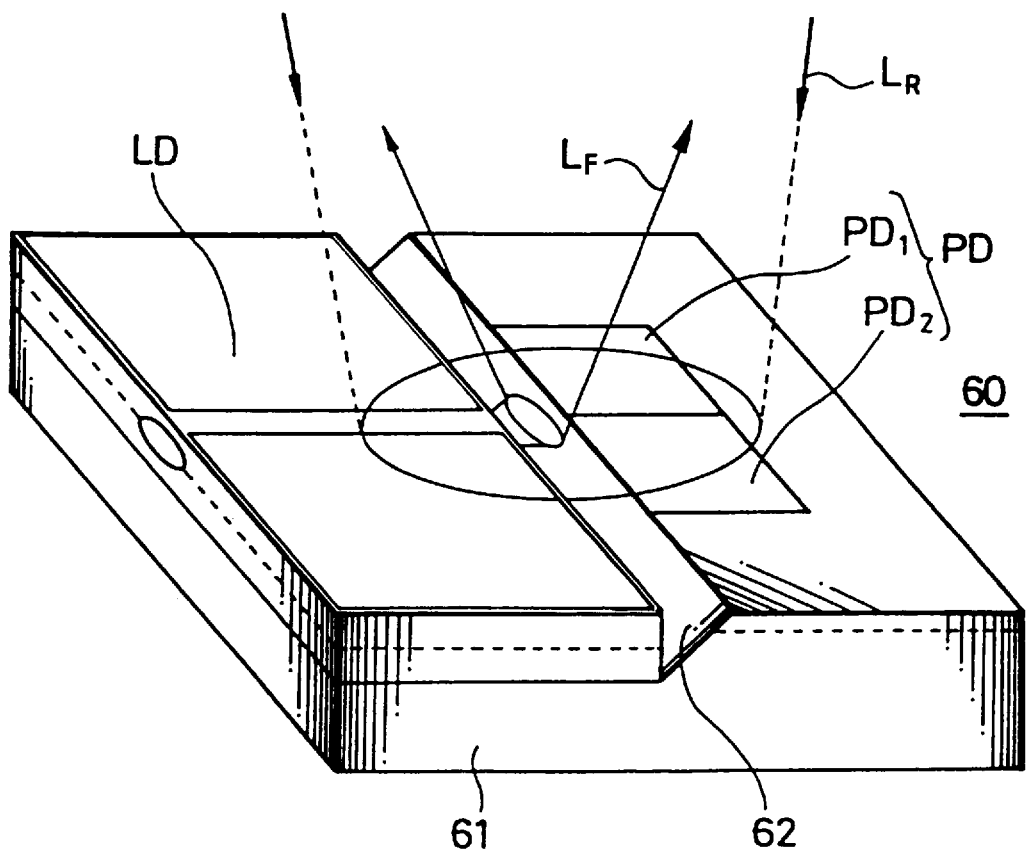
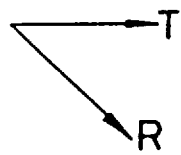

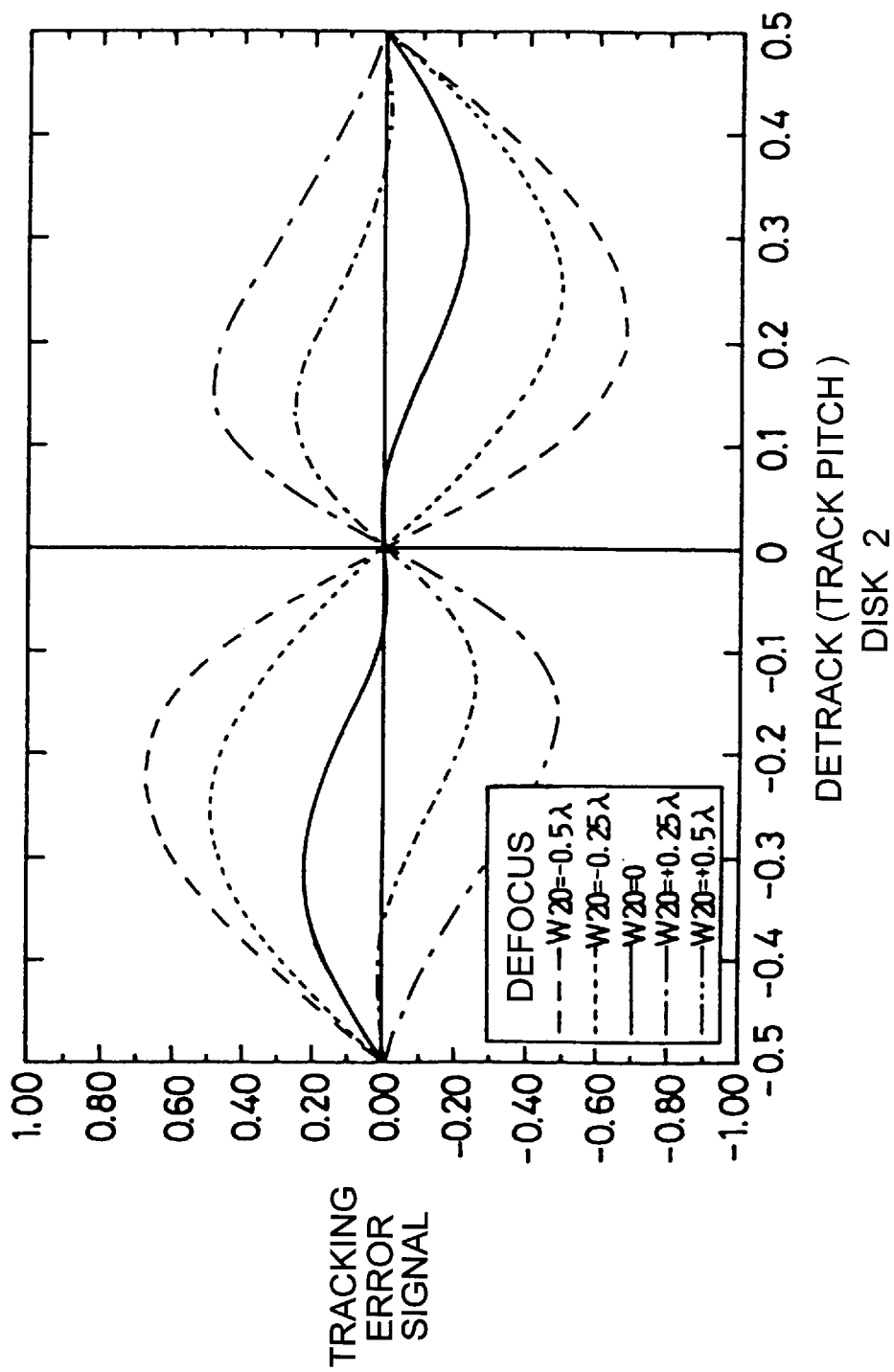

OPTICAL DEVICE WHICH CAN GENERATE TRACKING SIGNAL USING SPLIT PHOTO DETECTING DEVICES

Priority to Japanese application No. P08-088490 Apr. 10, 1996 is claimed for this application. This Japanese application is incorporated herein by reference to the extent not already presented herein.

BACKGROUND OF THE INVENTION

The present invention relates to optical devices which, for example, can be used with an optical pickup.

In conventional optical devices such as an optical pickup of an optical disk drive for a compact disc (CD) player or a magneto-optical disk drive, optical assemblies such as a grating or a beam splitter are fabricated individually so that optical devices unavoidably become complicated in arrangement and large in size. Moreover, when such optical assemblies are fabricated on the base of the optical device in a hybrid fashion, optical assemblies should be set up with high alignment accuracy.

A push-pull method or a method using three beams has heretofore been used to detect a tracking signal (tracking servo).

According to the conventional push-pull method, which is one of the tracking servo methods, when a spot of incident light beam is shifted from the track or pit on the disk, +1st order diffraction light and −1st order diffraction light reflected from the disk are given different intensities of light with the result that a far-field pattern becomes asymmetric. Accordingly, signals corresponding to the asymmetry of the far-field pattern are detected by two detectors, for example, and these detected signals are computed by a calculator thereby to detect a displacement of spots of incident light beam.

The tracking servo using the push-pull method needs high alignment accuracy in the fabrication of optical assemblies and has a small margin to cope with a disk skew caused when a lens is shifted in the lateral direction or a disk is warped.

When the lens is shifted, returned light from the disk is shifted in the direction perpendicular to a split line of photo-detecting devices on the photo-detecting surface. There is then the problem that a large offset occurs in the signal. (See, FIGS. 11 and 12 herein.)

FIG. 11 is a diagram showing an optical system for a tracking servo using push-pull method.

In this optical system, split photodiodes PD1 and PD2 with a split line parallel to the tangential direction T of a disk 52, i.e., a recording direction of the disk 52, are disposed at the position distant from a Confocal Plane (CP) of a lens 51 (which is used as a converging means). Then, a differential amplifier 53 computes signals received by these photodiodes PD1 and PD2 in such a way as to compute (PD2−PD1) to generate a tracking error signal TE as a tracking signal.

As shown in FIG. 11, when the lens 51 is shifted in the radial direction R (vertical to the tangential direction T) of the disk 52, beam spots of light beams received by the photodiodes PD1 and PD2 also are shifted in the radial direction R accordingly. As a consequence, even when the proper tracking is made, an equality of tracking error signal TE=0 is not satisfied.

FIG. 12 shows a relationship between detrack (i.e., amount of tracking displacement) and a tracking error signal obtained when the lens 51 is shifted along the radial direction R in the optical system of FIG. 11. FIGS. 12A and 12B shows tracking error signals obtained for two kinds of disks (disks 1 and 2) with different groove shapes, respectively.

Study of FIGS. 12A and 12B reveals that, when the tracking error signal is shifted depending on the lens shift direction, the tracking error signal is not canceled even though the tracking is made properly.

The tracking servo uses the three-beam spot method, as mentioned hereinbefore. In this case, light beam has to pass a diffraction grating so that when recorded information is reproduced, an optical coupling efficiency at which an RF (high-frequency) signal is detected decreases.

When light is returned to the light-emitting portion and returned light is received and detected, light should be split by a beam splitter or a hologram. There is then the disadvantage that an amount of light received by a photo-detecting portion decreases.

In view of the aforesaid disadvantage, in order to reduce the number of optical assemblies and to alleviate alignment accuracy required when optical assemblies are fabricated so that the whole of the optical device can be simplified and miniaturized, there is proposed a CLC (confocal laser coupler) configuration in which a light-emitting portion is disposed at the confocal position of a converging means such as a lens and a photo-detecting portion is formed at the position near the confocal at which the light-emitting portion is disposed.

When a tracking signal is detected based on the three-beam spot method by directly-returned light like the CLC configuration, as shown in the optical system of FIG. 13, outward light and inward light are both transmitted through a grating 55 so that an amount of outward light decreases and that diffraction light beams are caused to interfere with each other on the two photodiodes PD1 and PD2 of the photo-detecting device disposed near a confocal plane CP. Therefore, when a differential amplifier 56 computes the signals detected by the photodiodes PD1 and PD2, it is difficult to obtain a correct result. Thus, the above-mentioned method is not useful in actual practice.

To eliminate the aforementioned offset, there has been proposed an optical device in which split photodiodes are disposed at the confocal position and these split photodiodes perform tracking servo based on the push-pull method (see co-pending patent application Ser. No. 08/603,872 whose title of the invention is "Optical Device"). FIG. 14 shows an example of such optical device.

An optical device 60 shown in FIG. 14 includes a semiconductor substrate 61 on which there are formed a semiconductor laser LD serving as a light-emitting means, a photodiode PD serving as a photo-detecting means, and a reflection plan 62 for reflecting light LF emitted from the semiconductor laser LD in the upper direction of FIG. 14. In FIG. 14, both of the semiconductor laser LD and the photodiode PD are disposed near the confocal position of a converging means (not shown) such as a lens, resulting in the aforementioned CLC configuration being made.

Returned light LR from a disk serving as a recording medium is received and detected by split photodiodes PD (PD1 and PD2) split by a split line of the disk tangential direction T which is parallel to the resonator direction of the semiconductor laser LD.

However, according to this optical device 60, a tracking error signal fluctuates considerably depending on the difference of disk type. In particular, the error signal fluctuates depending on the differences of sizes and shapes of grooves in the disk or in the defocused state.

FIG. 15 shows a relationship between a detrack and a tracking error signal obtained by the optical device 60 shown in FIG. 14 in the case of the defocused state. FIGS. 15A and 15B show tracking error signals obtained for two types of disks (disks 1 and 2) with grooves of different shapes.

Study of FIGS. 15A and 15B reveals that the tracking error signals are inverted in phase depending upon the defocusing direction.

If the phase of the tracking error signal is inverted as described above, then endeavors to effect a proper tracking after the signal processing has been performed become complex, resulting in a complicated detection system. As a consequence, the process for manufacturing optical devices also becomes complicated.

SUMMARY OF THE INVENTION

In view of the foregoing, according to the present invention, there is provided an optical device, such as an optical pickup, in which the number of optical assemblies can be reduced, alignment accuracy required when optical assemblies are fabricated can be alleviated, the whole of the optical device can be simplified, and the optical device of CLC configuration can be miniaturized. Further, this optical device can stably generate a tracking signal, such as a tracking error signal and can be easily manufactured by semiconductor process.

An optical device according to the present invention includes a photo-detecting means for detecting returned light reflected on a recording medium and a shielding means disposed between the recording medium and the photo-detecting means for shielding a part of returned light. This shielding means includes edges in at least the two directions and is disposed so as to shield the returned light by these edges. The photo-detecting means is split in the direction substantially perpendicular to the recording medium at its at least an axis in which a signal is recorded. The optical device can generate a tracking signal by comparing signals detected by the split photo-detecting devices.

According to the present invention, since the shielding means, having the edges in at least the two directions, shields a part of the returned light, the photo-detecting device, which is split in the direction substantially perpendicular to the recording medium at its at least the axis in which the signal is recorded, receives the returned light and the optical device can generate the tracking error signal by comparing the signals thus detected, it is possible to avoid the tracking signal from being affected by offset or the like caused when an amount of light received by the photo-detecting means is changed due to a shift of recording medium or defocusing.

These and other features of the invention are discussed in greater detail below in the following detailed description of the presently preferred embodiments with reference to the accompanying drawings.

BRIEF DESCRIPTION OF THE DRAWINGS

FIG. 5 is a diagram showing the manner in which the photo-detecting device is split.

FIGS. 8A and 8B are graphs showing a relationship between a detrack amount and a tracking error signal measured when a lens is shifted in the tangential direction.

FIG. 14 is a perspective view illustrating a conventional optical device.

FIGS. 15A and 15B are graphs showing a relationship between a detrack amount and a tracking error signal measured in the defocused state in the optical device shown in FIG. 14.

DETAILED DESCRIPTION OF THE PRESENTLY PREFERRED EMBODIMENTS

The present invention will be described below with reference to the drawings.

An optical device according to a first embodiment is applied to an optical pickup for reproducing and recording an optical recording medium.

Figure 1A:
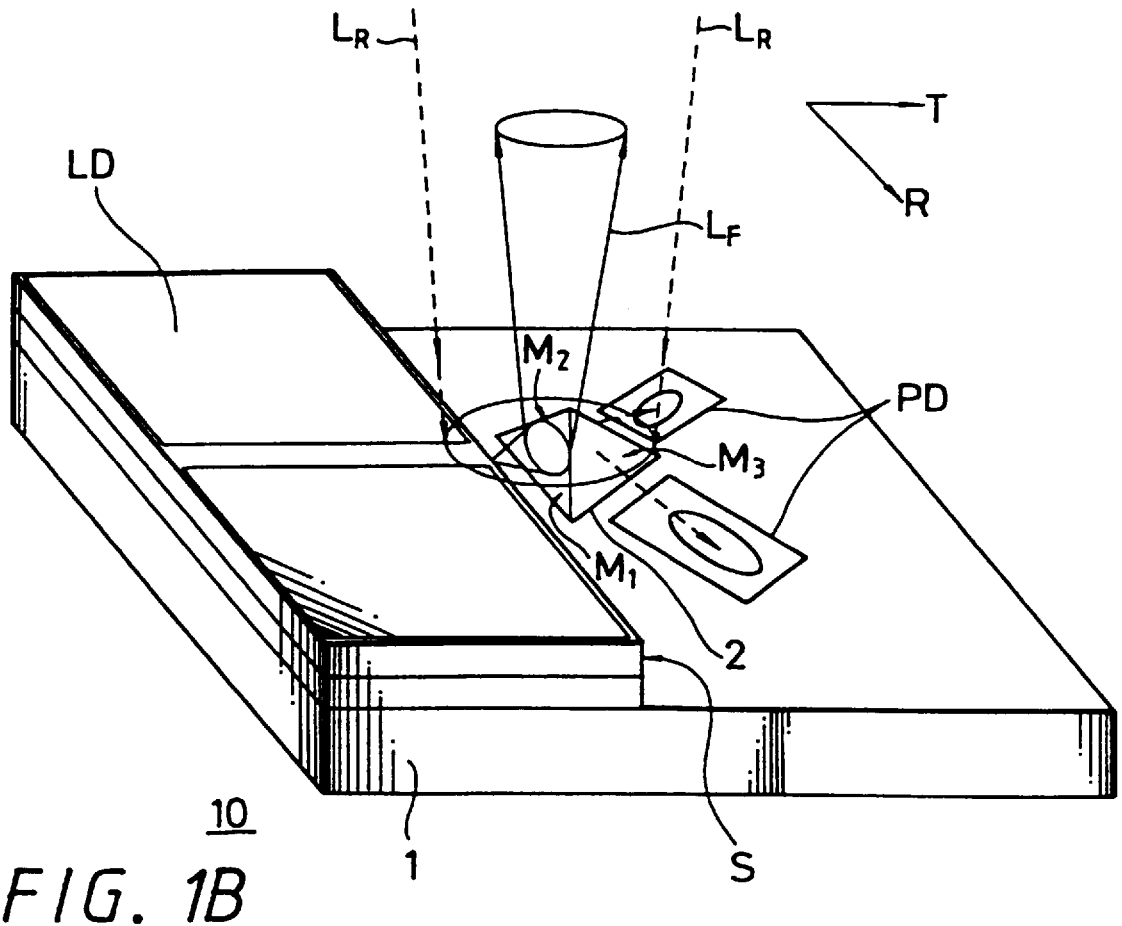
FIG. 1A is a perspective view illustrating an optical device according to an embodiment of the present invention.

FIG. 1A shows an optical device 10 according to an embodiment of the present invention. The optical device 10 comprises a semiconductor substrate 1 on which a semiconductor laser LD is formed as a light-emitting means, two photodiodes PD fabricated into the semiconductor substrate 1 as photo-detecting means, an optical assembly 2 of triangular pyramid configuration having a mirror M1 for reflecting light LF emitted from the semiconductor laser LD in the direction perpendicular to the semiconductor substrate 1, and two mirrors M2, M3 for reflecting directly-returned light LR from the optical disk toward the two photodiodes PD.

In FIG. 1, the triangular pyramid-shaped assembly 2 forms an optical device of CLC (confocal laser coupler) configuration disposed near a confocal position of a converging means such as a lens (not shown) and the emitted light LF and the returned light LR to form a confocal optical system.

A striped-ridge of the semiconductor laser LD is formed in parallel to the tangential direction (axial direction of a disk in which a signal is recorded) T of a disk serving as a recording medium, and a resonator end face S is made parallel to the radial direction (disk radius direction; perpendicular to the tangential direction) R of the disk.

The two mirrors M2 and M3 for reflecting the returned light LR are adapted to function as a knife-edge which is used as a shielding means for shielding a part of returned light LR by mirror end edges Ea, Eb and Ec on ridge lines of the triangular pyramid-shaped assembly 2.

Figure 1B:
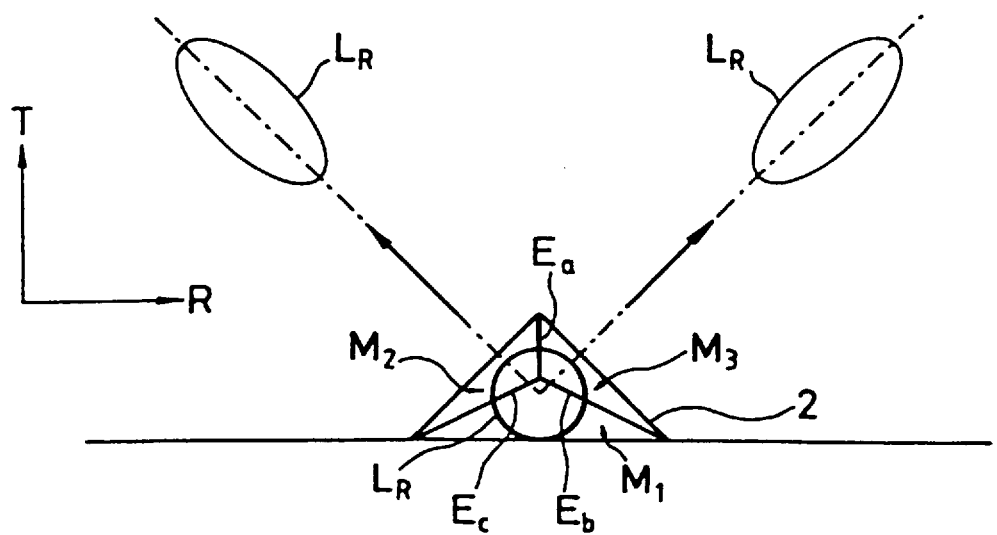
FIG. 1B is a plan view of FIG. 1A.

FIG. 1B is a plan view of FIG. 1A. As illustrated, the two mirrors M2 and M3 for reflecting the returned light LR are symmetrical to each other with respect to the disk radial direction R. Thus, the returned light LR is symmetrically reflected in two directions with respect to the disk radial direction R, and received by the photodiodes PD shown in FIG. 1A.

Figure 2:
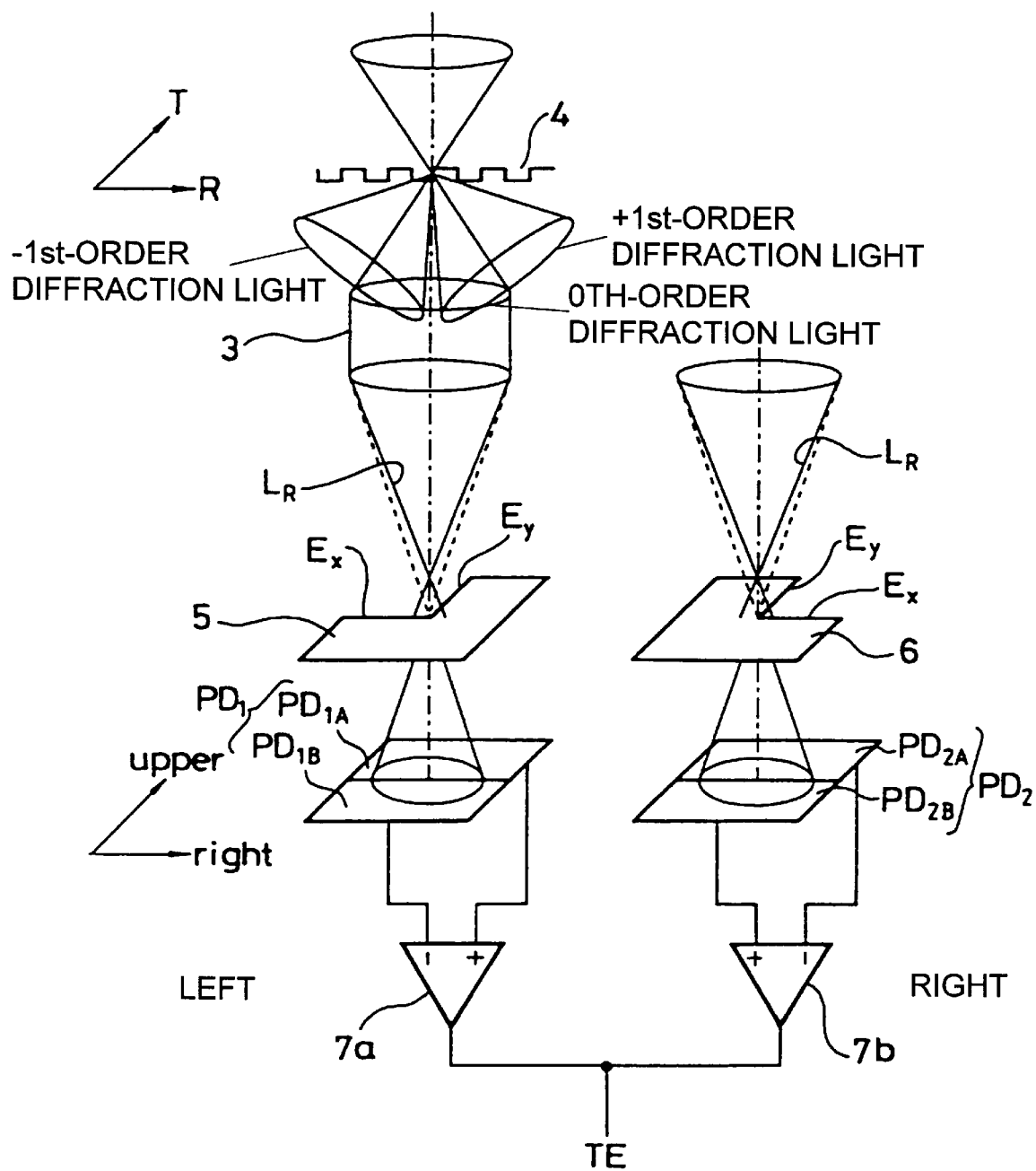
FIG. 2 is a schematic diagram showing an optical system which is used to calculate an intensity distribution of returned light.

With respect to the optical device 10 of this embodiment, in order to facilitate the physical understanding of its optical system and to simplify the following calculations, assume an optical system shown in FIG. 2.

In association with the mirrors M2 and M3 provided on the side surface of the triangular pyramid-shaped assembly 2 shown in FIG. 1, two knife-edges of L configuration are disposed near the confocal position as shown in FIG. 2.

Specifically, a disk 4 serving as a recording medium is disposed at one confocal position of a lens 3 serving as a converging means and two knife-edges 5 and 6 having edges Ex and Ey extending in two divergent directions are disposed at the other confocal position. These knife-edges 5 and 6 are disposed symmetrically with respect to the disk tangential direction T of the returned light LR, i.e. the center line of recording track direction of the disk, and have edges Ex (parallel to the radial direction R) and Ey (parallel to the tangential direction T) which divide the confocal plane into four in the disk radial direction R, i.e. disk radius direction and the tangential direction T.

The edges Ex and Ey of the knife-edges 5 and 6 of FIG. 2 correspond to the end edges Ea, Eb and Ec of the mirrors M2 and M3 of the triangular pyramid-shaped assembly 2 of FIG. 1.

The returned light LR, which was diffracted to 0th-order diffraction light, +1st-order diffraction light and −1st-order diffraction light by the grooves of the disk 4, are traveled through the opening of the lens 3 and the two knife-edges 4, 6 on the confocal plane and its bundle of light is diverged and thereby diffracted. Finally, the divergant two bundles of light are received and detected by the photo-detecting surfaces PD1 and PD2 perpendicular to the sufficiently far optical axis.

The photo-detecting surfaces PD1 and PD2 are split by split lines in the radial direction R by half with respect to the tangential direction T to thereby provide PD1A, PD1B and PD2A, PD2B. The photo-detecting device comprising these photodiodes PD can generate a tracking signal, e.g. tracking error signal TE, by comparing detected signals using operational amplifiers 7a and 7b connected to the photodiodes PD1 and PD2, for example.

A light intensity distribution on the photo-detecting surfaces PD1 and PD2 obtained in the properly-focused state in this optical system was calculated by two-dimensional FFT (fast Fourier transform). Calculation is expressed by the following equation (1):

$$\phi(p,q) = \frac{\phi_0}{\lambda R} \int dx\, dy\, M(x,y) \Phi\left(\frac{x}{\lambda f}, \frac{y}{\lambda f}\right) e^{-2\pi j(px+qy)} \quad (1)$$

$$= \frac{\phi_0}{\lambda R} F\left\{ M(x,y) \Phi\left(\frac{x}{\lambda f}, \frac{y}{\lambda f}\right) \right\}$$

$$\Phi(u,v) = F\{A(Xi, Yi)\}$$

$$p = X_0/\lambda R \quad q = Y_0/\lambda R$$

In this equation, the following definitions apply:
(x, y): coordinates on the confocal plane
(Xi, Yi): coordinates on the lens plane
($X_0$, $Y_0$): coordinates on the photo-detecting surface (intersection point between optical axis of returned light LR and photo-detecting surface is origin),
(p, q): normalized coordinates on the photo-detecting surface,
$\phi$: amplitude of light on the photo-detecting surface,
$\Phi$: amplitude of light on the confocal plane,
A: amplitude of light on the lens plane,
f: focal length of lens,
R: distance from the confocal plane to the photo-detecting surface,
M: knife-edge function, and
F : Fourier transform.

The knife-edge function M is a function which can indicate transmittance of light by giving 1 or 0 to each (x, y) coordinate point within the knife-edge.

The light amplitude A on the lens surface is calculated by applying a square pit as a model, and an amount which results from adding a defocused amount as an aberration amount $W_{20}$ (=$\delta f \cdot NA^2/2$).

Calculation conditions are as follows:
Wavelength: 0.78 $\mu$m
Disk groove: track pitch is 1.6 $\mu$m, groove depth is $\lambda/6$ and duty ratio (area ratio of groove portion) is 35%.
Lens: numerical aperture is 4 mm, focal distance on the medium side is 4.2 mm, focal distance on the light source side is 25.0 mm
Shape of knife-edge: shaped as shown in FIG. 2
Position of photo-detecting surface: Sufficiently distant from the confocal plane and perpendicular to optical axis (Fraunhofer area)

Figure 3:
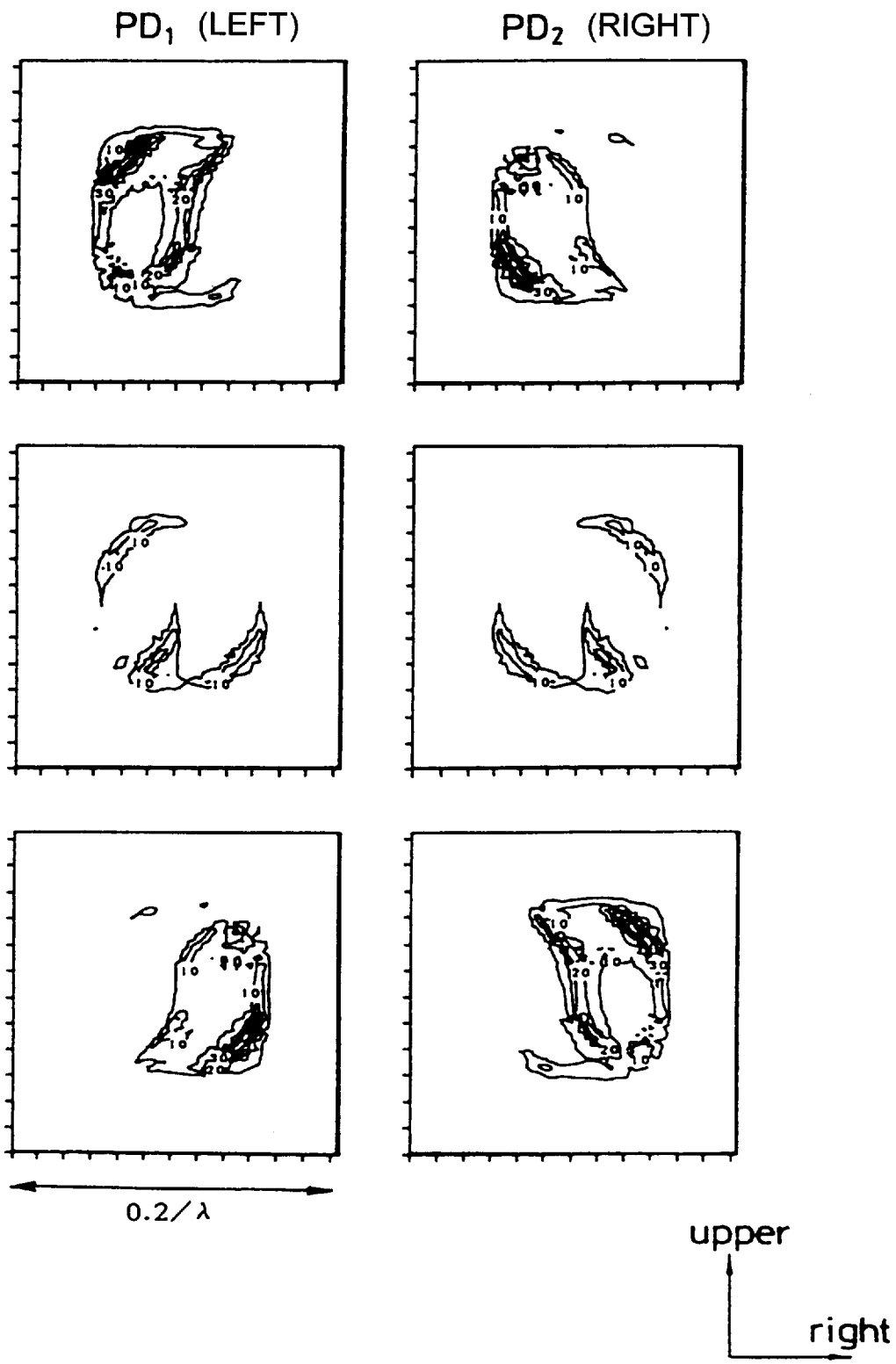
FIG. 3 is a diagram of contour-lines, and illustrating an intensity distribution of returned light in the properly-focused state.

FIG. 3 shows calculated results.

The left half and the right half in FIG. 3 show light intensity distributions of diffraction light beams measured on the photo-detecting surfaces of the two knife-edges 5 and 6. Upper row, middle row and lower row show by contour-lines light intensity distributions obtained when the tracking is shifted by −¼ track pitch, 0 track pitch and +¼ track pitch, respectively.

To make characteristics of the detection signal clear, 0th-order diffraction light, +1st-order diffraction light and −1st-order diffraction light are respectively separated from the diffraction light of the groove of the disk 4 under the condition that the defocused amount is zero, i.e. the properly-focused state is achieved as shown on the middle row in FIG. 3. Then, their light intensity distributions on the photo-detecting surfaces PD1 and PD2 were calculated.

Figure 4:
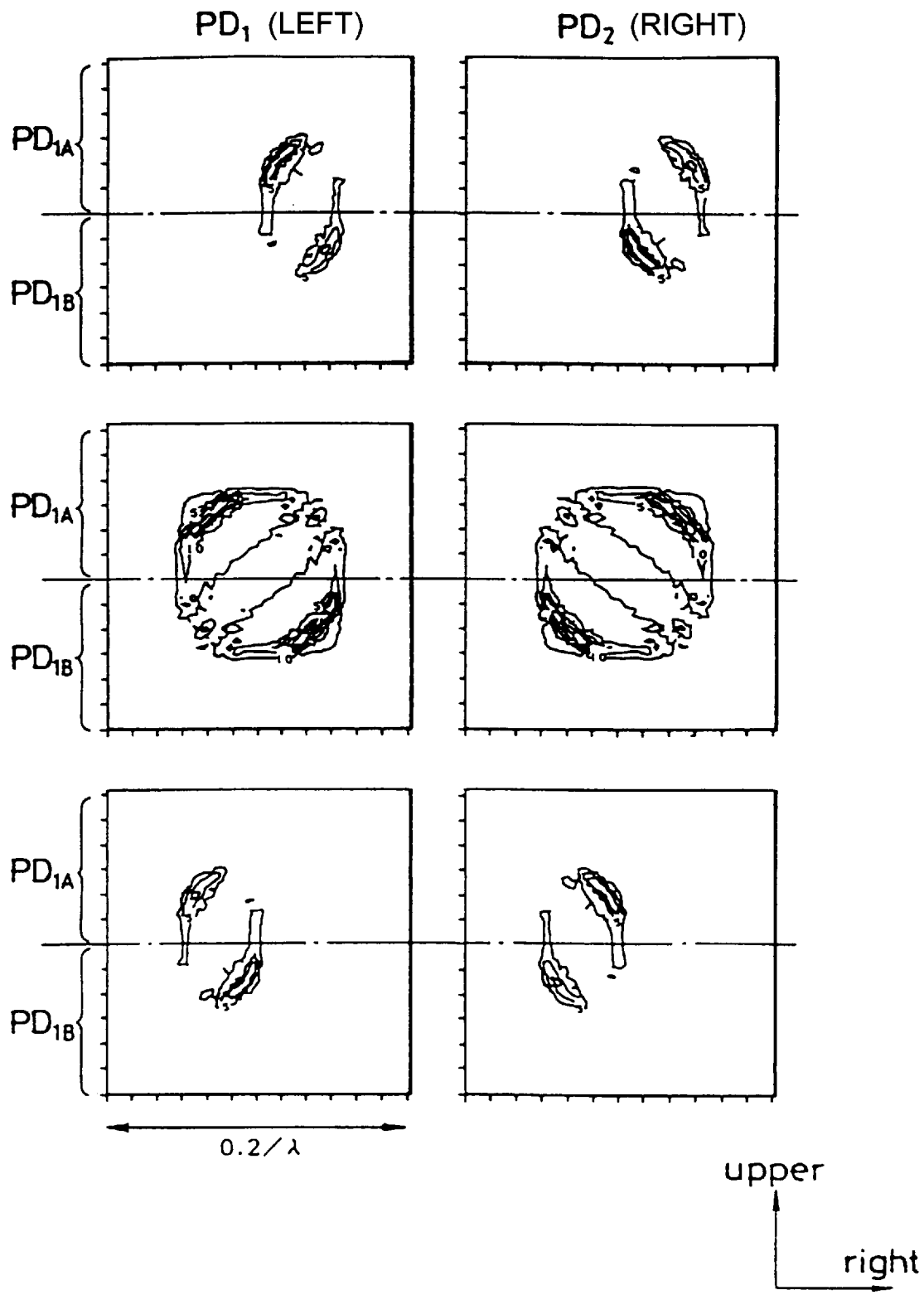
FIG. 4 is a diagram of control-lines, and illustrating an intensity distribution of returned light in the properly-focused state and in the on-track state.

FIG. 4 shows calculated results by contour-lines in a manner similar to FIG. 3. Upper, middle and lower rows in the left and right photo-detecting surfaces PD1 and PD2 show −1st-order diffraction light, 0th-order diffraction light and +1st-order diffraction light, respectively.

Accordingly, it is obvious from the linearity of light that the calculated results of FIG. 3 are the overlapping calculated results in which phases with surface distributions are added to the upper, middle and lower rows of FIG. 4.

Moreover, the phases of the −1st-order diffraction light, the 0th-order diffraction light and the +1st-order diffraction light are uniformly changed on the surface by −δ, 0, and +δ (=2π×detracked amount/track width) due to detracking.

Now consider the results shown in FIG. 4. The fact that the +1st-order diffraction light and the −1st-order diffraction light are separated on the respective photo-detecting surfaces PD1 and PD2 is similar to the case in which there are not provided the knife-edges. The reason for this is that the photo-detecting surface is located at the position sufficiently distant from the confocal plane.

However, the above-mentioned case considerably differs from the case in which there are not provided the knife-edges is that light intensity distributions of 0th-order diffraction light, +1st-order diffraction light and −1st-order diffraction light are deviated by the special knife-edge shape shown in FIG. 2 so that peak positions of respective light intensities are not always coincident Having examined the upper half PD1A of the left photo-detecting surface PD1, it is to be appreciated that the peak positions of the 0th-order diffraction light and the +1st-order diffraction light are substantially coincident but the peak positions of the 0th-order diffraction light and the −1st-order diffraction light are not coincident. Accordingly, having split the upper and lower portion by half to take a signal of only the upper left PD1A, such signal becomes a signal in which an interference of the 0th-order diffraction light and the +1st-order diffraction light becomes dominant. Similarly in the lower left PD1B, an interference between the 0th-order diffraction light and the −1st-order diffraction light becomes dominant.

If a differential signal (PD1A−PD1B) of the upper and lower PD1A and PD1B is calculated, there is then obtained such a signal in which a push-pull signal with a relatively small amplitude of opposite phase is added to a signal close to an ordinary push-pull signal, more precisely, a push-pull signal with large interference. The reason for this is that the push-pull signal is expressed as and interference between the 0th-order diffraction light and the +1st-order diffraction light and an interference between the 0th-order diffraction light and the −1st-order diffraction light.

Conversely, the light intensity distribution is reversed on the right photo-detecting surface PD2 because the configurations of the two knife-edges 5 and 6 for the left and right photo-detecting surfaces PD1 and PD2 have the knife-edges Ex and Ey in both of the radial direction R and the tangential direction T and the knife-edges are axis-symmetrical to each other with respect to the center line of the tangential direction T.

FIG. 4 shows measured results of light intensity distribution obtained when the on-tracking is made. Under the detracked condition shown on the upper and lower rows of FIG. 3, the phases of the +1st-order diffraction light and the −1st-order diffraction light are changed but the amplitudes thereof are not changed with the result the light intensity distribution becomes the same as that of FIG. 4.

In the example of the above-mentioned calculation, since the split line for splitting the photo-detecting surfaces PD1 and PD2 by half is extended in the radial direction R, when the lens 3 is shifted in the radial direction R, the light intensity distribution of the returned light LR is shifted along the split line so that a signal offset, which causes a problem in the ordinary push-pull, does not occur.

Further, as shown in FIG. 2, the left and right photo-detecting surfaces PD1 and PD2 are split by half in the upper and lower direction to provide PD1A, PD1B and PD2A, PD2B and a tracking error signal TE is obtained as shown in the following equation (2):

$$TE = \text{(upper left − lower left) + (lower right − upper left)} \quad (2)$$
$$= (PD_{1A} - PD_{1B}) + (PD_{2B} - PD_{2A})$$

Although the equation (2) expresses a sum of the left and right two push-pull signals, the two push-pull signals are added reversely in the left and right so that the shifted amount of the light intensity distribution of the returned light LR due to the lens shift in the tangential direction T (upper and lower direction in FIG. 4) is canceled.

Moreover, the fluctuation of the light intensity distribution due to the knife-edges caused in the defocused state is canceled similarly.

Accordingly, it is possible to obtain a stable tracking signal having characteristics different from those of the conventional confocal push-pull method and the ordinary push-pull method.

If a magnitude of interference between the 0th-order diffraction light and +1st-order diffraction light and a magnitude of interference between the 0th-order diffraction light and the −1st-order diffraction light are respectively expressed by coupling constants κ (upper half) and κ* (lower half) in the upper and lower half portions of the respective photo-detecting surfaces, coupling constants having large interference in 0th-order approximation are respectively expressed as κ1, κI* and coupling constants having small interference are expressed as κ2, κ2* and a tracking error signal obtained by the ordinary push-pull method is expressed as $TE_0$, then the above equation (2) can be simply expressed by the following equation (3):

$$TE = [\{(\kappa 1 - \kappa 2) - (\kappa 1^* - \kappa 2^*)\} + \{(\kappa 1 - \kappa 2) - (\kappa 1^* - \kappa 2^*)\}] TE_0 \quad (3)$$

Further, if the left and right photo-detecting surfaces PD1 and PD2 are split by four to provide four photo-detecting surfaces $PD_{1AP}$, $PD_{1AQ}$, $PD_{1BP}$, $PD_{1BQ}$ and $PD_{2AP}$, $PD_{2AQ}$, $PD_{2BP}$, $PD_{2BQ}$ and a push-pull signal is calculated as shown by the following equation (4), then a resultant push-pull signal becomes substantially coincident with an ordinary push-pull signal PP.

$$\begin{aligned}PP = &\{\text{(left upper left + left lower left) − (left upper right +} \\ &\text{left lower right)}\} + \{\text{(right upper left + right lower left) −} \\ &\text{(right upper right + right lower right)}\} \\ = &\{(PD_{1AP} + PD_{1BP}) - (PD_{1AQ} + PD_{1BQ})\} + \\ &\{(PD_{2AP} + PD_{2BP}) - (PD_{2AQ} + PD_{2BQ})\}\end{aligned} \quad (4)$$

As described above, the optical device according to this embodiment can obtain the ordinary push-pull signal PP at the same time.

At that time, a focus error signal FE based on the knife-edge method is calculated by the following equation (5):

$$\begin{aligned}FE = &\text{(left lower right − left upper left) + (right lower left −} \\ &\text{right upper right)} \\ = &(PD_{1BQ} - PD_{1AP}) + (PD_{2BP} - PD_{2AQ})\end{aligned} \quad (5)$$

Moreover, a confocal push-pull signal CPP can be detected by the following equation (6):

$$CPP = (\text{all left}) - (\text{all right}) = PD_1 - PD_2 \quad (6)$$

As described above, the present invention can be applied to an optical device only by changing the split line on the photo-detecting surface or increasing the number of the split lines without reducing information amount of signal.

As will be clear from FIGS. 3 and 4, the configuration of the knife-edge has a certain degree of flexibility. Specifically, the configuration of the knife-edge may be such that a deflection of light intensity distribution exists in both of the radial direction and the tangential direction.

To demonstrate that the present invention can also be applied to a mirror structure such as is shown in FIG. 6, i.e. a confocal knife-edge (CKE) structure, the knife-edge shown in FIG. 2 was replaced with a CKE structure based on the mirror boundary and then a tracking error signal was calculated.

Figure 6A:
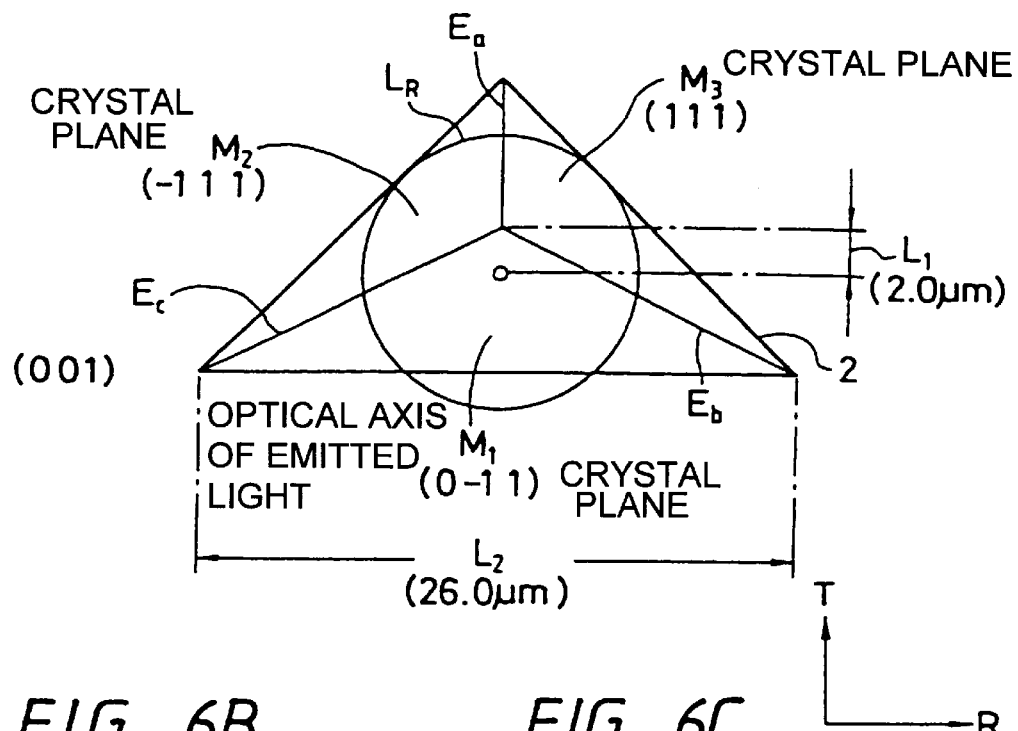
FIG. 6A is a plan view illustrating a CKE structure of the optical device shown in FIG. 1.
Figures 6B, 6C:
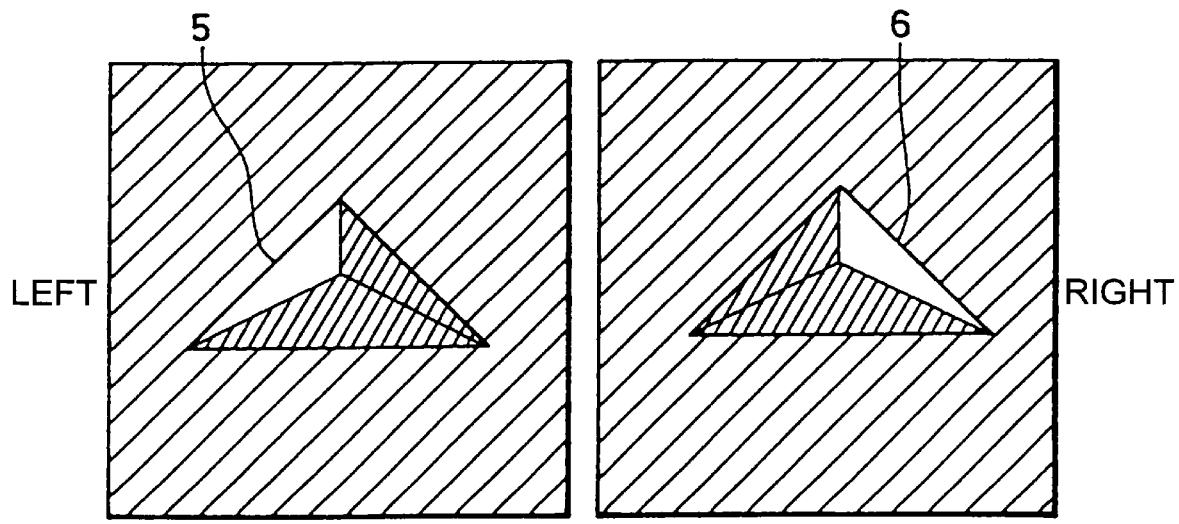
FIGS. 6B and 6C are plan views illustrating configurations of knife-edges in the structure shown in FIG. 6A.

FIG. 6A is a plan view illustrating a triangular pyramid-shaped structure forming the CKE structure. In the CKE structure formed of the triangular pyramid-shaped assembly 2, a length L1 from the vertex of triangular pyramid to the irradiated position of an optical axis of emitted light LF is 2.0 μm, a length L2 of a base of a mirror M1 for reflecting the emitted light LF is 26.0 μm, a semiconductor substrate 1 is composed of a (001) crystal plane, the mirror M1 is composed of a (0–11) crystal plane, and mirrors M2, M3 for reflecting returned light LR are composed of a (–111) crystal plane and a (111) crystal plane. Then, the mirrors M2 and M3 are adapted to act as a knife-edge 5 having a configuration shown in FIG. 6B and a knife-edge 6 having a configuration shown in FIG. 6C by mirror end edges Ea, Eb, Ec existing on the ridgelines of the triangular pyramid-shaped assembly 2.

With respect to the CKE structure shown in FIG. 6, the tracking error signal TE (equation (2)) of the present invention was calculated based on equation (1).

Conditions under which the tracking error signal was calculated are as follows. Disks 1 and 2 which have been applied to the calculation were of two types having grooves of different configurations.

Wavelength: 0.78 μm

Disk groove: track pitch is 1.6 μm

Disk 1: groove recording with a groove depth of λ/6 at a duty ratio of 35%

Disk 2: land recording with a groove depth of λ/6 at a duty ratio of 50%

Lens: numerical aperture is 4 mm, focal distance on the medium side is 4.2 mm and focal distance on the light source side is 25 mm Knife-edge: formed as shown in FIG. 6

Position of photo-detecting surface: position sufficiently distant from the confocal plane (Fraunhofer area)

A value of tracking error signal is normalized by the whole light amount of the returned light LR including an amount of light which is not received by the existence of the knife-edge.

Calculated results are illustrated in FIGS. 7, 8 and 9.

In these graphs, a horizontal axis represents a detracked amount and a vertical axis represents a tracking error signal amount. FIG. 7 shows a lens shift dependence of the tracking error signal TE with respect to the radial direction R, FIG. 8 shows a lens shift dependence of the tracking error signal TE with respect to the tangential direction T, and FIG. 9 shows a defocused amount dependence.

Figure 7A:
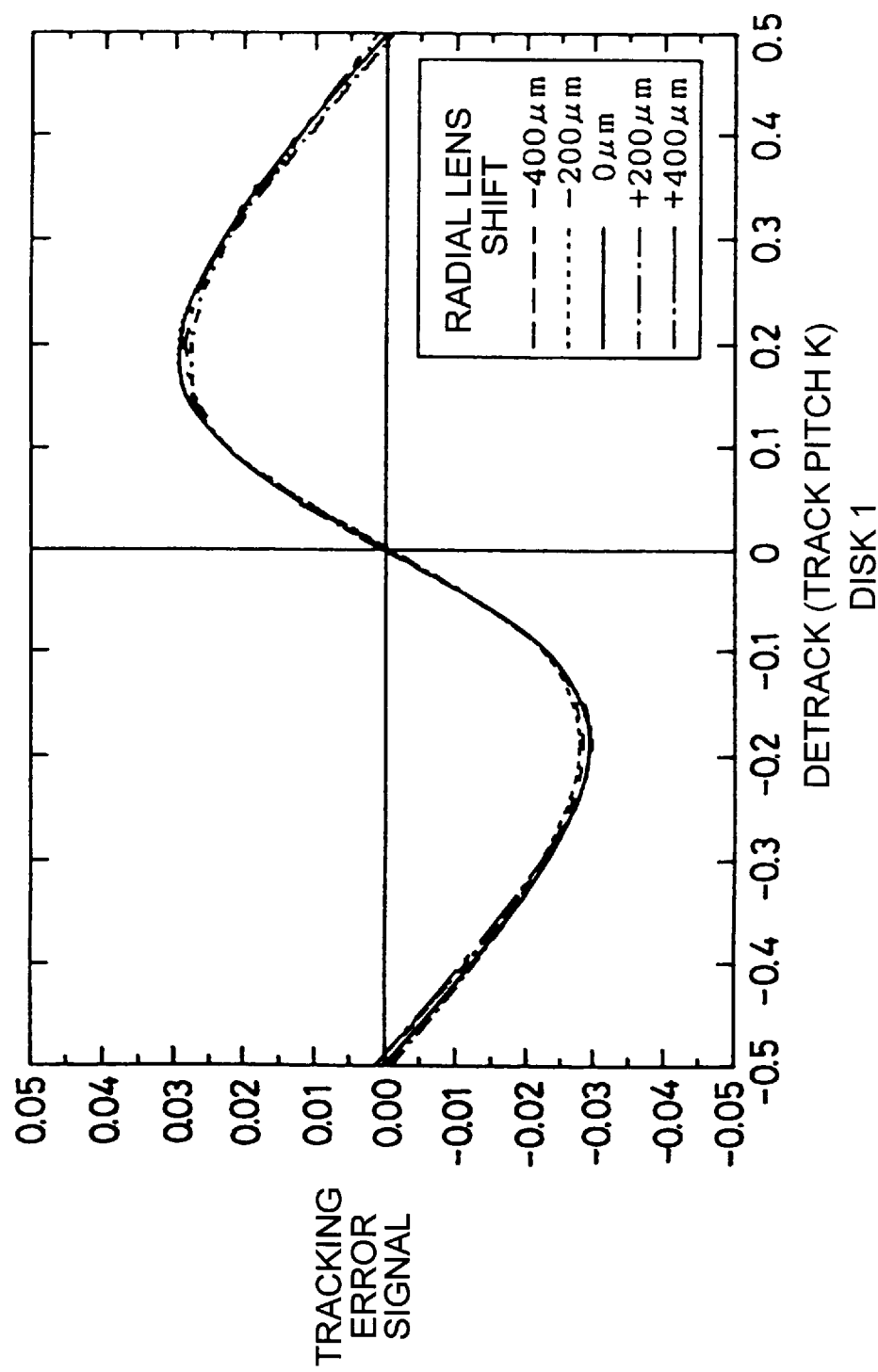
FIGS. 7A and 7B are graphs showing a relationship between a detrack amount and a tracking error signal measured when a lens is shifted in the radial direction.
Figure 7B:
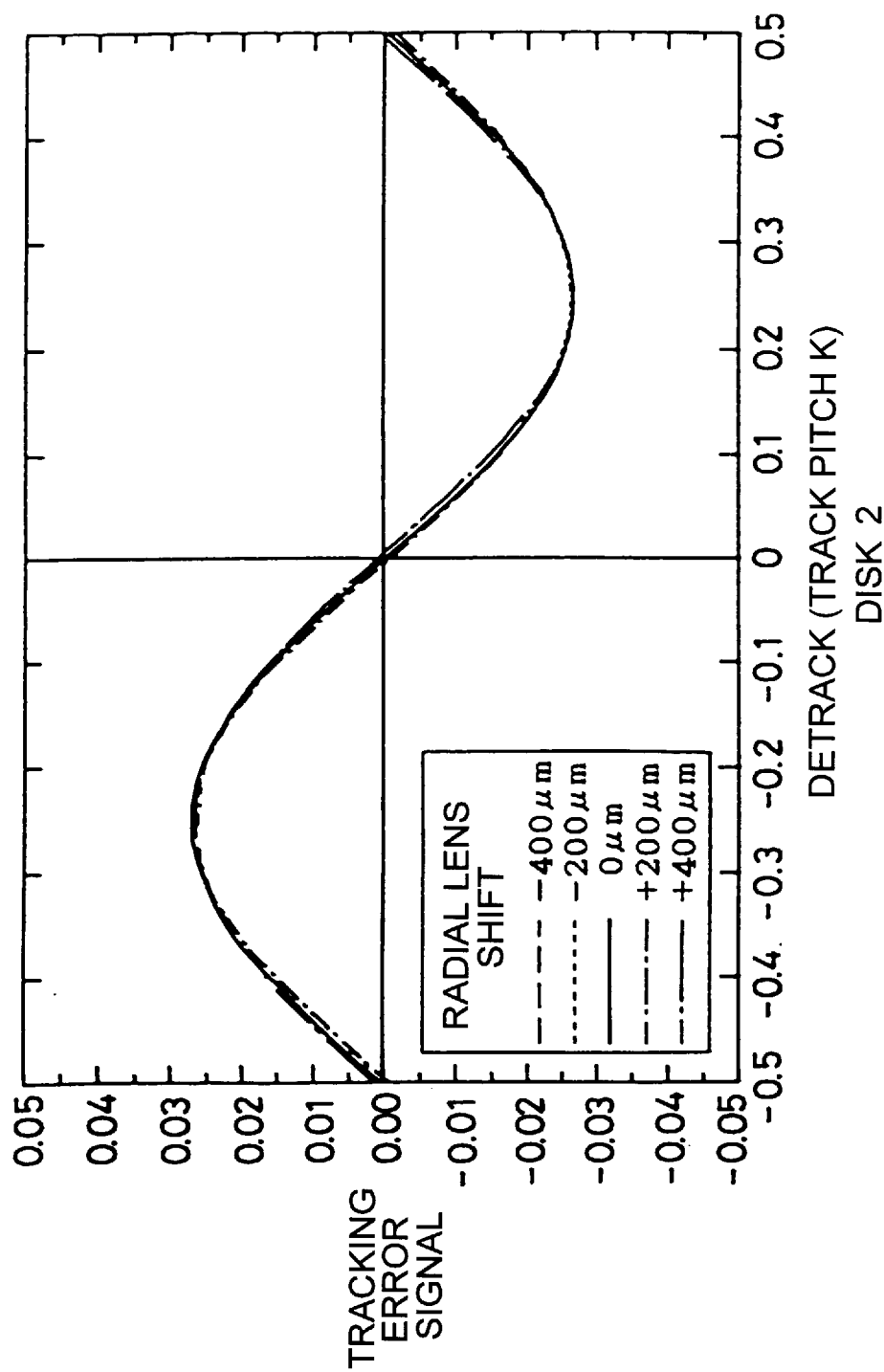
Figure 9A:
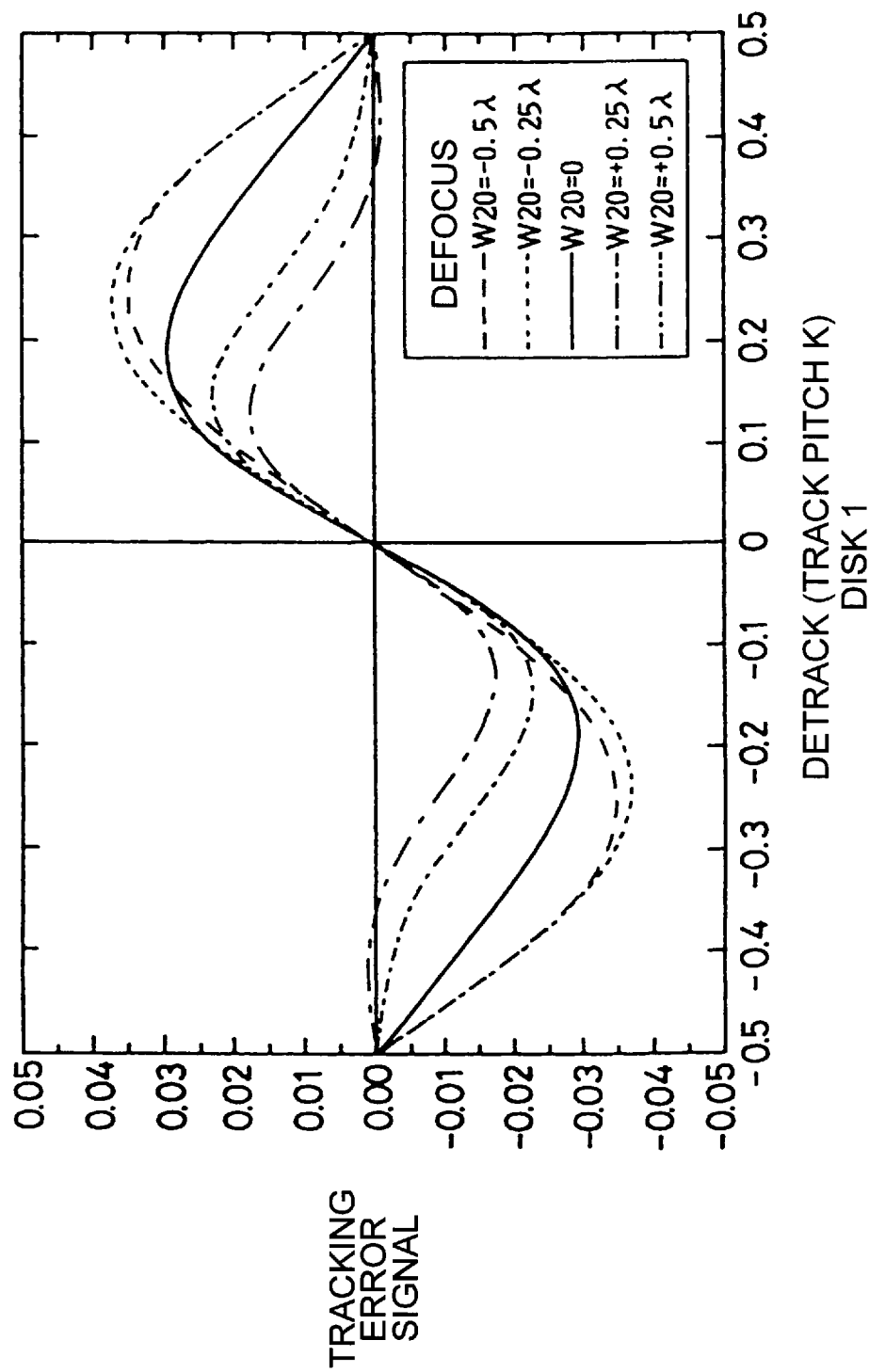
FIGS. 9A and 9B are graphs showing a detrack amount and a tracking error signal measured in the defocused state.
Figure 9B:
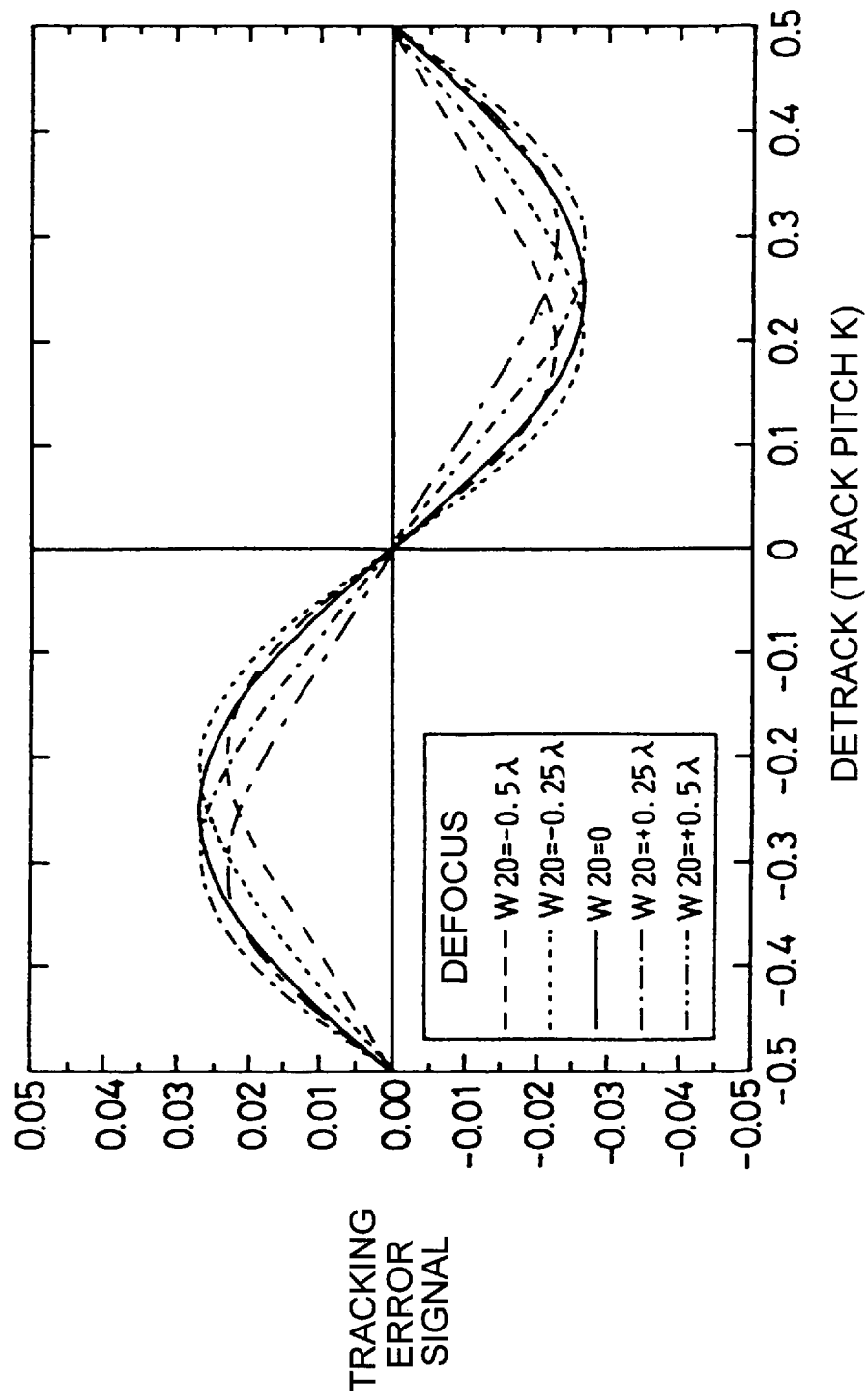

FIGS. 7A, 8A, 9A show calculated results obtained from the disk 1, and FIGS. 7B, 8B, 9B show calculated results obtained from the disk 2, respectively.

Figure 15B:
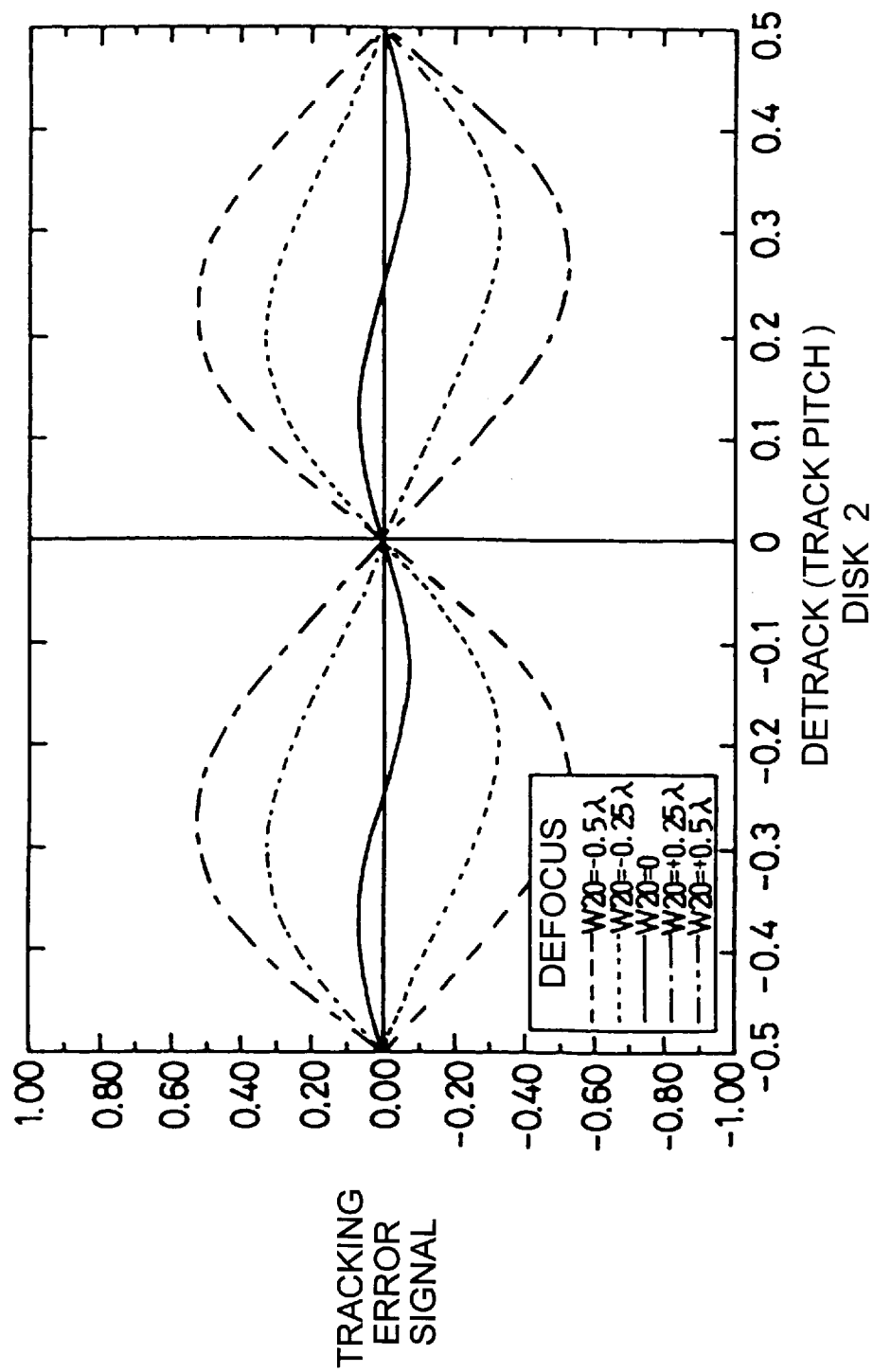

Study of the above-mentioned graphs reveals that the tracking error signal has no offset substantially but only the amplitude of the tracking error signal is fluctuated slightly. This offset amount of the tracking error signal is very small compared with the case in which the ordinary push-pull method is used. The amount in which the amplitude of the tracking error signal is fluctuated due to the defocusing is very small compared with the amount in which the amplitude of the tracking error signal is fluctuated due to the defocusing according to the confocal push-pull method shown in FIG. 15. Moreover, the fluctuation of the amplitude of the tracking error signal can be eliminated electrically.

The value of the normalized signal is small because the amount of received light is decreased due to the knife-edge and the defocusing. However, having compared the value of the normalized signal according to the present invention with the value of the normalized signal of the ordinary optical system in consideration of the case in which the amount of received light is decreased when a grating and a beam splitter are used in the ordinary optical system, the absolute value of the normalized signal according to the present invention is equal to that of the normalized signal of the ordinary optical system. This is also true in the disk signal (RF signal).

In the CKE device, the photo-detecting surfaces composed of the mirrors M2 and M3 are not perpendicular to the optical axis of the returned light LR as shown in FIG. 1. To correct the amount in which these photo-detecting surfaces are not perpendicular to the optical axis of the returned light, coordinates should be transformed (approximately transformation of the first degree) by multiplying the Fourier integration term of equation (1) with an intensity correction term (R2/R'2) and a phase correction term (exp {–ik (R'–R)}) because a distance from the knife-edge to an arbitrary point on the photo-detecting surface is different.

The following equation (7) shows a coordinate transformation used when an amount of the slanted photo-detecting surface is corrected.

$$\vec{n}_{mr} = (\alpha, \beta, \gamma), \quad \alpha^2 + \beta^2 + \gamma^2 = 1 \quad (7)$$

$$R'^2 = R^2 + 4\gamma(\alpha X_O + \beta X_O)R \quad R = H/(1 - 2\gamma^2)$$

$$p' = -\left\{ X_0 - (R' - R)\frac{\alpha}{\gamma} \right\} /\lambda R'$$

$$q' = -\left\{ Y_0 - (R' - R)\frac{\beta}{\gamma} \right\} /\lambda R'$$

where (x, y, z): coordinates on the CKE surface, ($X_0$, $Y_0$): coordinates (intersection point between optical axis of each returned light and photo-detecting surface is origin) on the photo-detecting surface, (p', q'): coordinates obtained on the photo-detecting surface corresponding to (p, q) of the equation (1) by linear transformation, $\vec{n}_{mr}$: normal vector of CKE mirror surface, and H: height of CKE mirror surface.

Figure 10:
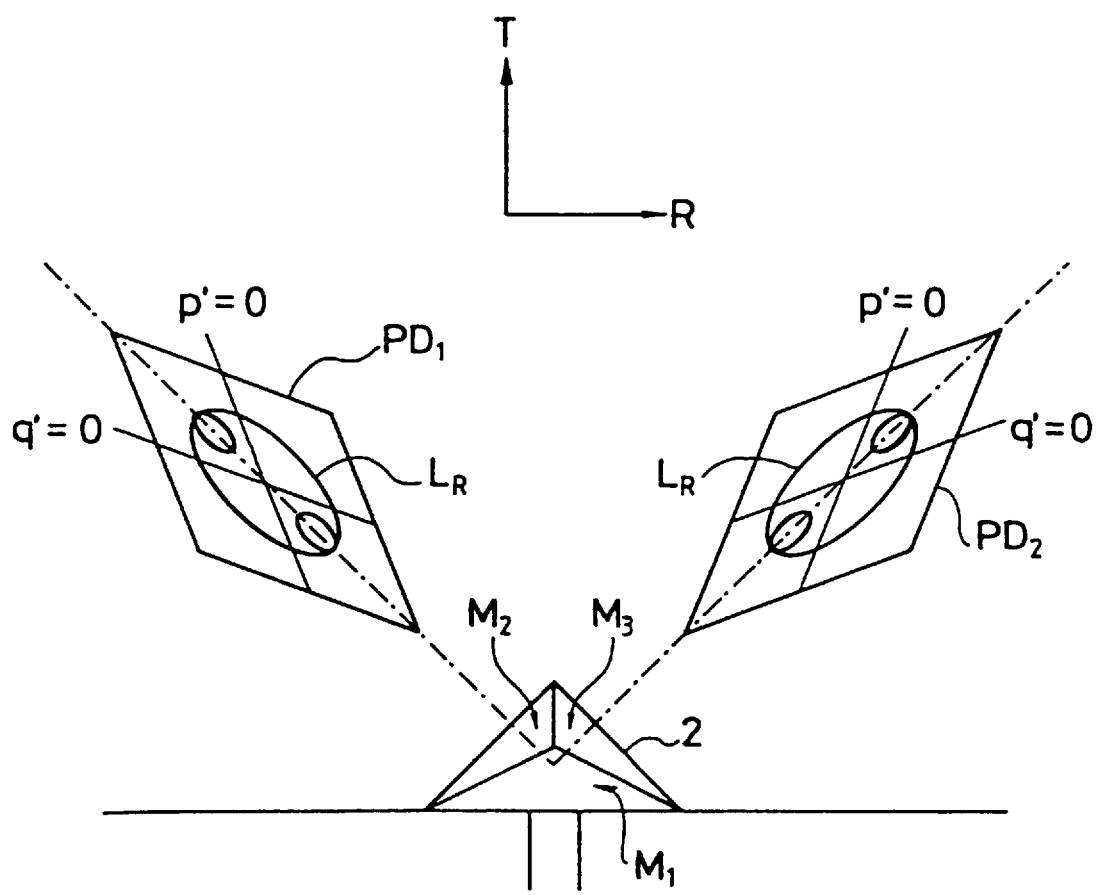
FIG. 10 is a plan view illustrating a CKE structure obtained after the CKE structure shown in FIG. 6A was coordinate-transformed.
Figure 11:
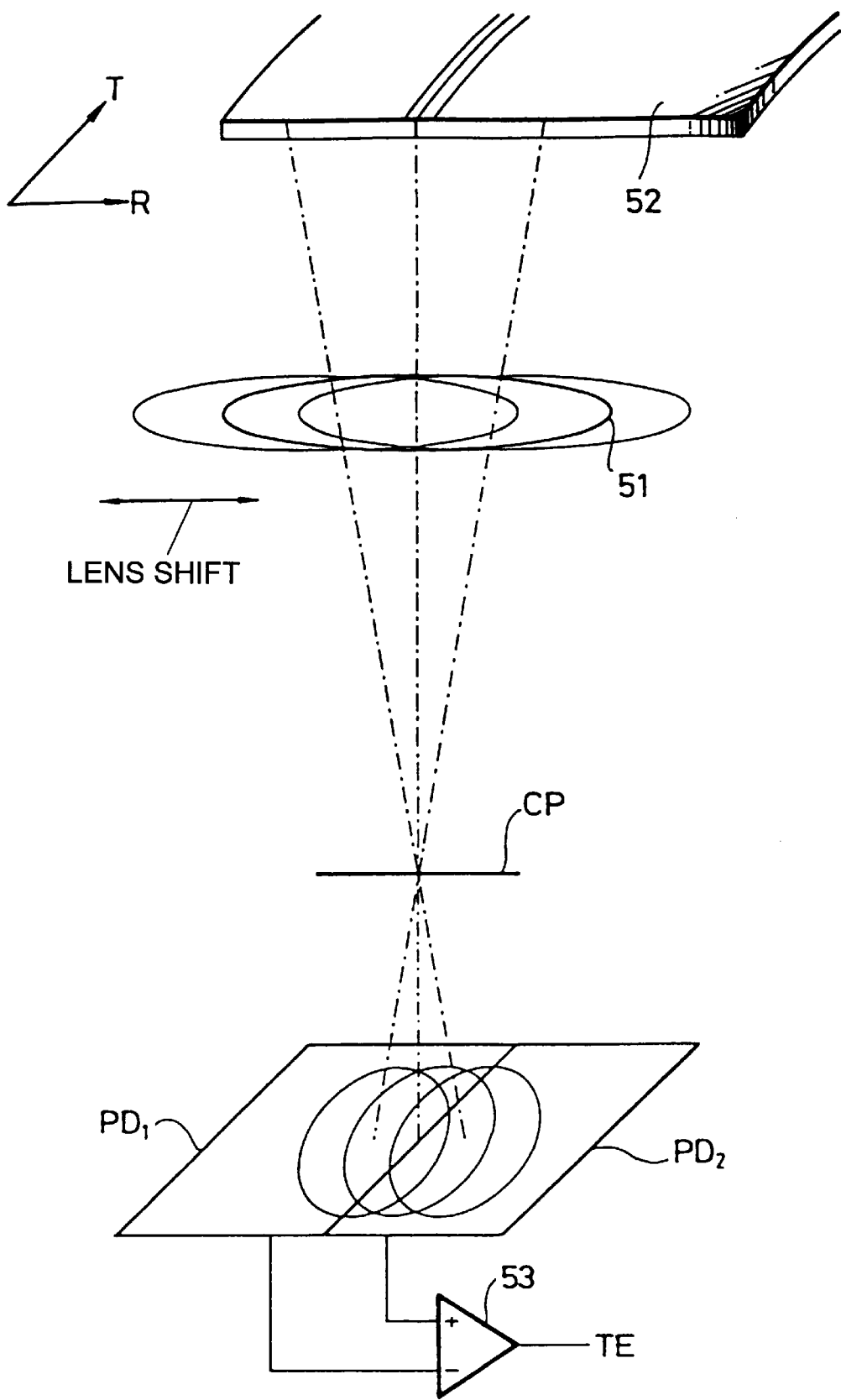
FIG. 11 is a schematic diagram showing an optical system for effecting tracking servo based on a conventional push-pull method.
Figure 12A:
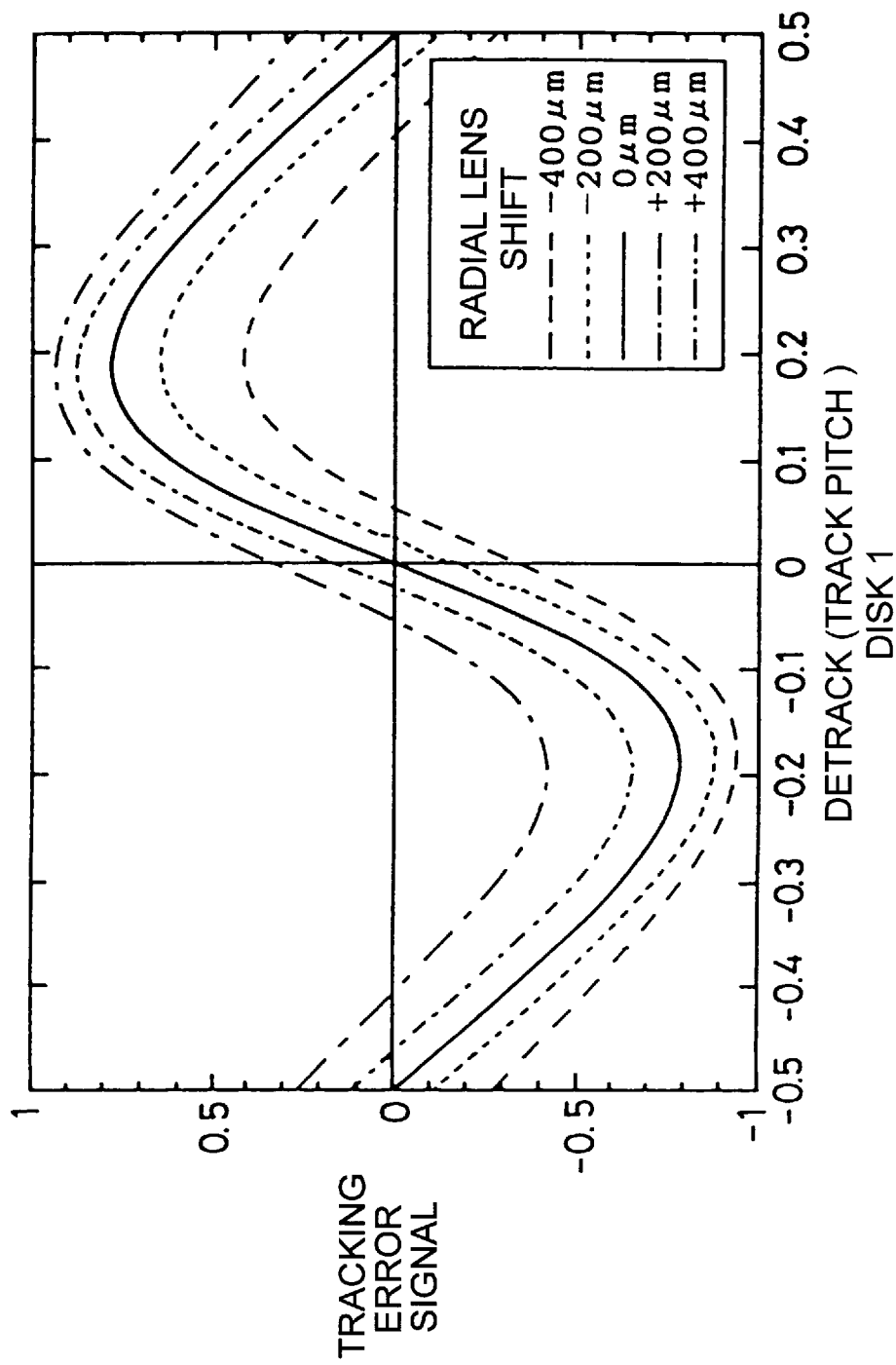
FIGS. 12A and 12B are graphs showing a relationship between a detrack amount and a tracking error signal measured when a lens is shifted in the optical system shown in FIG. 11.
Figure 12B:
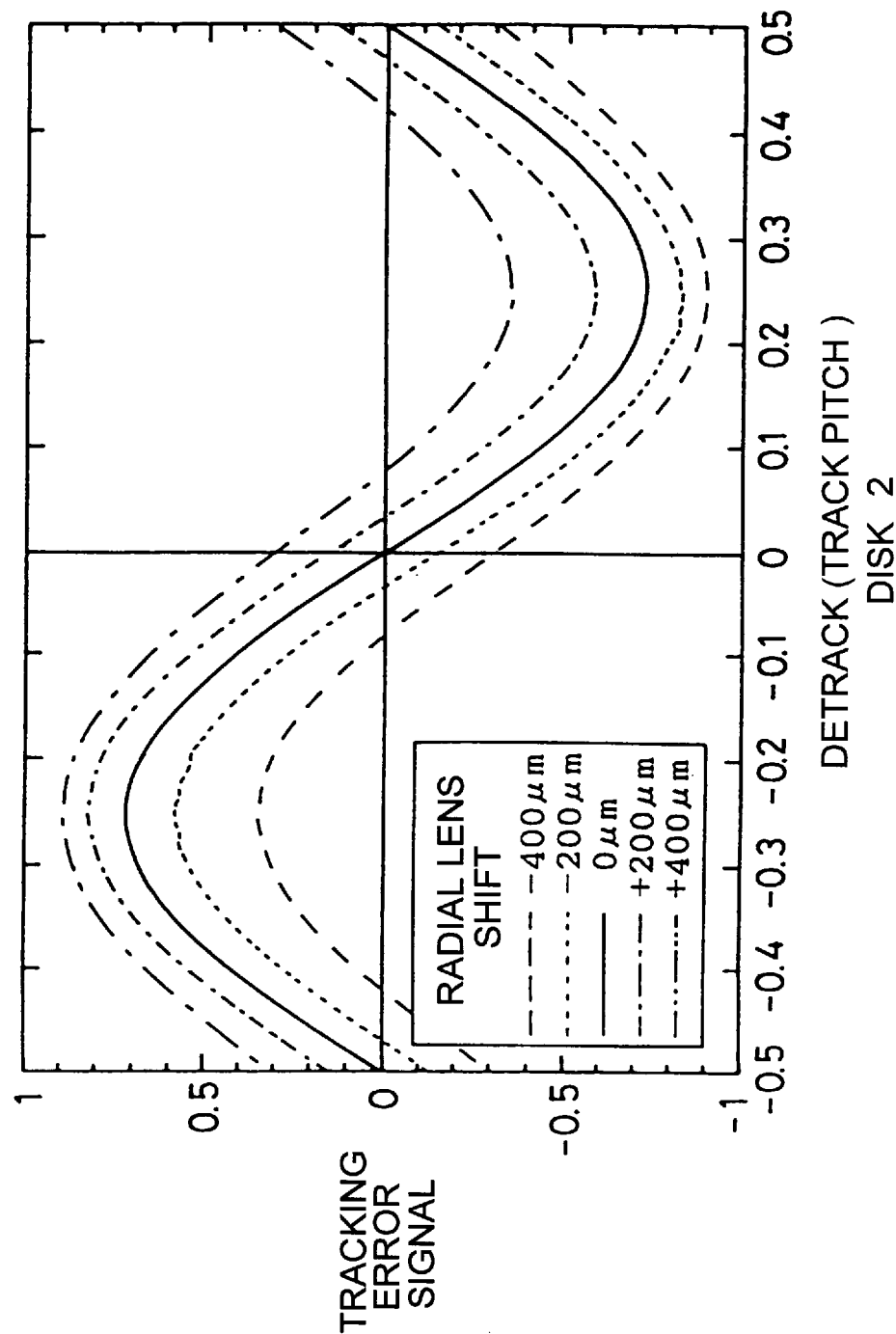
Figure 13:
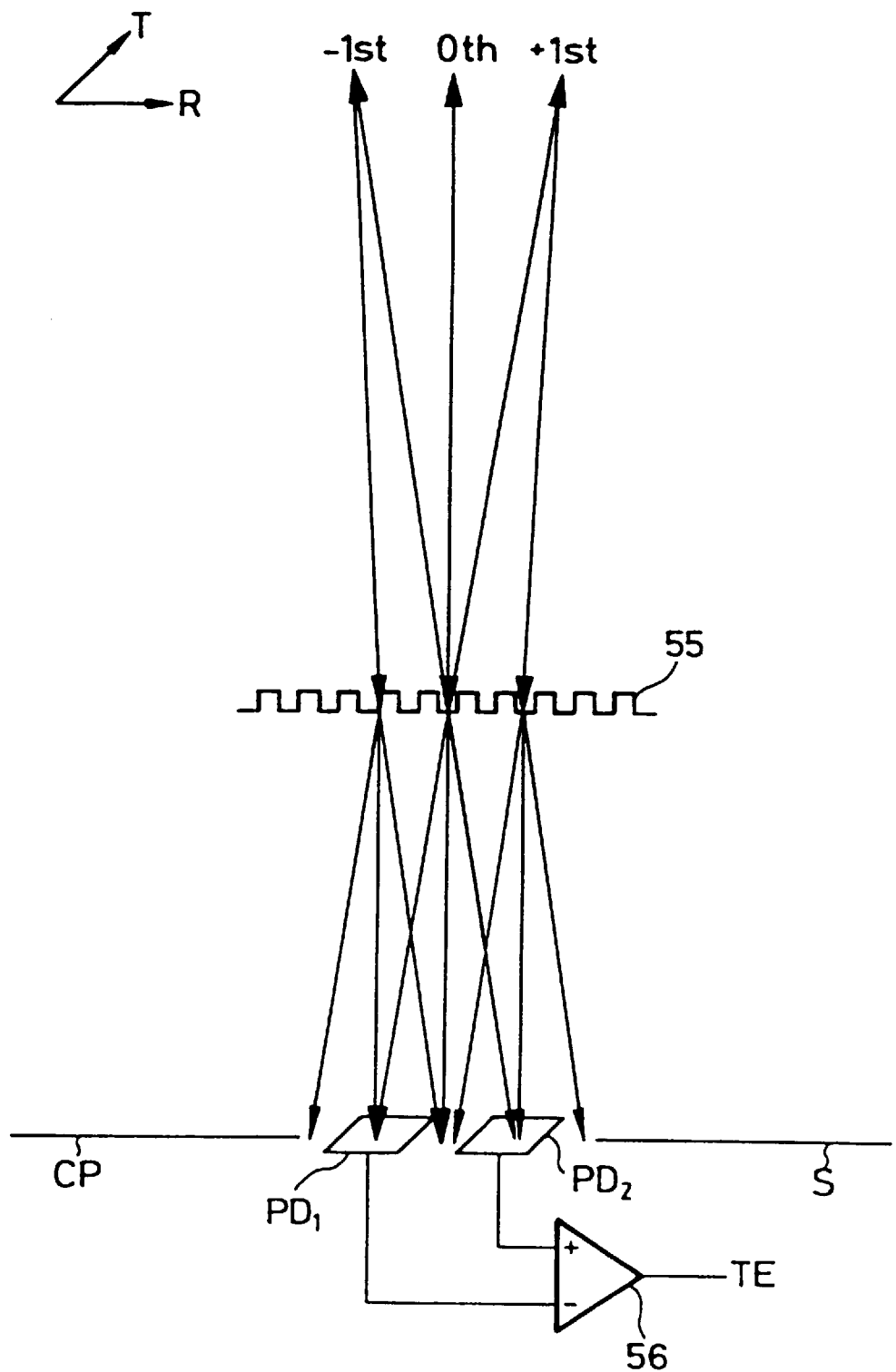
FIG. 13 is a schematic diagram of an optical system for effecting tracking servo based on a three-beam spot method in an optical device of CLC configuration.

Therefore, according to the present invention, if the aforementioned equation (2) is applied to the triangular pyramid-shaped CKE assembly 2 shown in FIGS. 1 and 6, then lines near the lines in which an equality of q'=0 is satisfied in the photo-detecting surfaces PD1 and PD2 may be used as split lines as shown in FIG. 10 (calculation is omitted). FIG. 10 is a schematic diagram showing a CKE structure obtained after the CKE structure shown in FIG. 6 was processed by coordinate transformation.

The photo-detecting surface of the device with the CKE structure is not sufficiently distant from the knife-edge like the Fraunhofer area (several 10s of to one hundred and several 10s of micrometers). As described above, although the split lines obtained at that time are those near the line in which the equality of q'=0 is satisfied, optical devices can select optimum positions depending upon the configuration of knife-edge and the distance to the photo-detecting surface. However, the manner in which the tracking error signal TE acts is not different qualitatively from that of the tracking error signal obtained in the case of the Fraunhofer area, i.e. the present invention can be applied to this case.

Even when amounts of light detected by the two photo-diodes are different depending on a difference of distance to the photo-detecting devices or a difference of transmittance (reflectivity) of mirror photo-detecting surfaces or the size and area of the photo-detecting surface are restricted, such different amount of detected light or limited size and area of the photo-detecting surface can be corrected by the following equation (8) in which the first and second terms on the right-hand side in the equation (2) are respectively multiplied with proper coefficients.

$$\begin{aligned} TE &= (C_1 \times \text{upper left} - C_2 \times \text{lower left}) + \\ & \quad (C_3 \times \text{lower right} - C_4 \times \text{upper right}) \\ &= (C_1 \times PD_{1A} - C_2 \times PD_{1B}) + (C_3 \times PD_{2B} - C_4 \times PD_{2A}) \end{aligned} \quad (8)$$

The amount of amplitude fluctuated due to the defocusing can be reduced by using these coefficients C1 to C4 as the function of the tracking error signal TE.

An influence exerted when the configuration of mirror of the CKE structure and the reflection angle are different is negligible. Therefore, the present invention can be satisfactorily applied to the case in which a mirror is composed of a crystal reflection surface different from that in FIG. 6.

The optical device according to the present invention can detect the tracking signal and the focus error signal. Moreover, the optical device according to the present invention can be used to detect displacement such as lens shift or disk skew. Specifically, the optical device according to the present invention can be used also as a position sensor effectively.

The optical device according to the present invention is not limited to the above-mentioned embodiment and may be modified variously without departing from the gist of the present invention.

According to the optical device of the present invention, since the CLC configuration in which the light-emitting means and the photo-detecting means are disposed near the confocal is applied to the optical device, optical assemblies can be aligned with ease.

According to the optical device of the present invention, the tracking signal can be stably detected by comparing the returned light shielded by the shielding means having edges in the two directions with the signals detected by the photo-detecting devices split with respect to the direction perpendicular to the recording medium at its axis in which the signal is recorded. Thus, it is possible to obtain a plurality of tracking signals based on different detection methods at the same time.

Further, since the light intensity distribution can be detected by a plurality of photo-detecting devices, an amount of signal information can be increased.

Furthermore, according to the optical device of the present invention, since the configurations of the edges of the shielding means and the split positions of the photo-detecting device are optimized, the optical device according to the present invention can be fabricated on the same semiconductor substrate by semiconductor batch process without any special manufacturing process.

Therefore, optical devices can be manufactured with ease, and optical devices which are small and light can be manufactured inexpensively.

Although modifications and changes may be suggested by those skilled in the art, it is the intention of the inventors to embody within the patent warranted hereon all changes and modifications as reasonably and properly come within the scope of their contribution to the art.

I claim:

1. An optical device comprising:

photo-detecting means for detecting a returned light reflected from a recording medium; converging means for converging said returned light onto said photo-detecting means; and shielding means disposed between said recording medium and said photo-detecting means for shielding a portion of said photo-detecting means from a portion of said returned light;

wherein said shielding means has a shielding element with edges extending in at least two divergent directions from within a path of said converged returned light and which is disposed so as to shield said returned light by said edges, and said photo-detecting means is split in a direction substantially perpendicular to an axis in which a signal is recorded on said recording means and said photo-detecting means generates a tracking signal by comparing signals detected by said photo-detecting means.

2. The optical device as claimed in claim 1, wherein said shielding means is disposed near a confocal point of said converging means.

3. The optical device as claimed in claim 1, wherein a direction in which one edge of said edges of said shielding means extends is substantially parallel to a direction in which a signal is formed on said recording medium.

4. An optical device as claimed in claim 1, wherein said shielding means has a plurality of shielding elements and said plurality of shielding elements are substantially symmetrical to each other with respect to a direction in which a signal is formed on said recording medium.

5. An optical device as claimed in claim 1, wherein said edges of said shielding means are formed by end edges of a reflecting mirror.

6. An optical device comprising:

light emitting means for emitting a light;

a reflective medium;

photo detecting means for detecting a returned light which is reflected from said reflective medium; and converging means for converging said emitted light and said returned light, said light emitting means, photo detecting means, and converging means being optically coupled to each other; and shielding means disposed in a path of said returned light between said reflective medium and said photo detecting means for shielding a portion of said photo-detecting means from a portion of said returned light, wherein said shielding means has a shielding element with at least two divergent edges from within a path of said converged returned light so as to shield said returned light by said two edges, and said photo detecting means is split in at least two elements in a direction substantially perpendicular to a direction in which a signal is recorded on said reflective medium.

7. The optical device as claimed in claim 6, wherein said shielding means is disposed near a confocal point of said converging means.

8. The optical device as claimed in claim 6, wherein a direction in which one edge of said edges of said shielding means extends is substantially parallel to a direction in which a signal is formed on said recording medium.

9. An optical device as claimed in claim 6, wherein said shielding means has a plurality of shielding elements and said plurality of shielding elements are substantially symmetrical to each other with respect to a direction in which a signal is formed on said recording medium.

10. An optical device as claimed in claim 6, wherein said edges of said shielding means are formed by end edges of a reflecting mirror.

* * * * *